United States Patent
Palmer et al.

(10) Patent No.: US 9,728,228 B2
(45) Date of Patent: Aug. 8, 2017

(54) VEHICLE EVENT PLAYBACK APPARATUS AND METHODS

(75) Inventors: Jason Palmer, San Diego, CA (US); Steven Sljivar, San Diego, CA (US)

(73) Assignee: SmartDrive Systems, Inc., San Diego, CA (US)

(*) Notice: Subject to any disclaimer, the term of this patent is extended or adjusted under 35 U.S.C. 154(b) by 0 days.

(21) Appl. No.: 13/571,416

(22) Filed: Aug. 10, 2012

(65) Prior Publication Data

US 2014/0046550 A1 Feb. 13, 2014

(51) Int. Cl.
*H04N 21/414* (2011.01)
*G11B 27/10* (2006.01)
*G08G 1/16* (2006.01)
*G11B 27/34* (2006.01)
*G09B 29/00* (2006.01)
(Continued)

(52) U.S. Cl.
CPC ........... *G11B 27/105* (2013.01); *G08G 1/167* (2013.01); *G11B 27/34* (2013.01); *G09B 29/007* (2013.01); *G09B 29/10* (2013.01); *H04N 21/41422* (2013.01); *H04N 21/4325* (2013.01)

(58) Field of Classification Search
USPC ....... 715/771, 716, 719, 772, 500.1; 701/48, 701/33.4, 301, 45, 31.4, 35; 340/903, 340/436, 435, 425.5, 96, 937, 905, 36, 340/576, 439, 426.28; 180/271, 287; 348/148, E7.085
See application file for complete search history.

(56) References Cited

U.S. PATENT DOCUMENTS

| 673,203 A | 4/1901 | Freund |
| 673,795 A | 5/1901 | Hammer |
| 673,907 A | 5/1901 | Johnson |

(Continued)

FOREIGN PATENT DOCUMENTS

| CA | 2469728 | 12/2005 |
| CA | 2469728 A1 | 12/2005 |

(Continued)

OTHER PUBLICATIONS

Trivinci Systems, LLC, Race-Keeper Systems User Guide, Jan. 2011, v1.1.02, pp. 34 and 39.*

(Continued)

*Primary Examiner* — Doon Chow
*Assistant Examiner* — Wendy Nicholas
(74) *Attorney, Agent, or Firm* — Sheppard Mullin Richter & Hampton LLP

(57) ABSTRACT

Vehicle event data playback systems have been devised and invented to provide authorized users means for advanced visual review. Detailed circumstances relating to vehicle operation are visually presented in these unique playback systems. In particular, a group of cooperating visual display devices operate in conjunction with each other to effect a detailed visual presentation of a vehicle's operational states. An interested party is afforded a high level of access to many data types in highly graphical and intuitive arrangements. Further, data replay access is enhanced by slow motion, fast forward, loop repeat, among others which have never before been associated with these data types nor with the compound visual presentations first taught in the accompanying disclosure.

18 Claims, 11 Drawing Sheets

(51) Int. Cl.
G09B 29/10 (2006.01)
H04N 21/432 (2011.01)

(56) References Cited

U.S. PATENT DOCUMENTS

| | | | |
|---|---|---|---|
| 676,075 A | 6/1901 | McDougall |
| 679,511 A | 7/1901 | Richards |
| 681,036 A | 8/1901 | Burg |
| 681,283 A | 8/1901 | Waynick |
| 681,998 A | 9/1901 | Swift |
| 683,155 A | 9/1901 | Thompson |
| 683,214 A | 9/1901 | Mansfield |
| 684,276 A | 10/1901 | Lonergan |
| 685,082 A | 10/1901 | Wood |
| 685,969 A | 11/1901 | Campbell |
| 686,545 A | 11/1901 | Selph |
| 689,849 A | 12/1901 | Brown |
| 691,982 A | 1/1902 | Sturgis |
| 692,834 A | 2/1902 | Davis |
| 694,781 A | 3/1902 | Prinz |
| 2,943,141 A | 6/1960 | Knight |
| 3,634,866 A | 1/1972 | Meyer |
| 3,781,824 A | 12/1973 | Caiati |
| 3,812,287 A | 5/1974 | Lemelson |
| 3,885,090 A | 5/1975 | Rosenbaum |
| 3,992,656 A | 11/1976 | Joy |
| 4,054,752 A | 10/1977 | Dennis |
| 4,072,850 A | 2/1978 | McGlynn |
| 4,258,421 A | 3/1981 | Juhasz |
| 4,271,358 A | 6/1981 | Schwarz |
| 4,276,609 A | 6/1981 | Patel |
| 4,280,151 A | 7/1981 | Tsunekawa |
| 4,281,354 A | 7/1981 | Conte |
| 4,401,976 A | 8/1983 | Stadelmayr |
| 4,409,670 A | 10/1983 | Herndon |
| 4,420,773 A | 12/1983 | Toyoda |
| 4,425,097 A | 1/1984 | Owens |
| 4,456,931 A | 6/1984 | Toyoda |
| 4,489,351 A | 12/1984 | d'Alayer de Costemore |
| 4,496,995 A | 1/1985 | Colles |
| 4,500,868 A | 2/1985 | Tokitsu |
| 4,528,547 A | 7/1985 | Rodney |
| 4,533,962 A | 8/1985 | Decker |
| 4,558,379 A | 12/1985 | Huetter |
| 4,588,267 A | 5/1986 | Pastore |
| 4,593,313 A | 6/1986 | Nagasaki |
| 4,621,335 A | 11/1986 | Bluish |
| 4,625,210 A | 11/1986 | Sagl |
| 4,630,110 A | 12/1986 | Cotton |
| 4,632,348 A | 12/1986 | Keesling |
| 4,638,289 A | 1/1987 | Zottnik |
| 4,646,241 A | 2/1987 | Ratchford |
| 4,651,143 A | 3/1987 | Yamanaka |
| 4,671,111 A | 6/1987 | Lemelson |
| 4,718,685 A | 1/1988 | Kawabe |
| 4,754,255 A | 6/1988 | Sanders |
| 4,758,888 A | 7/1988 | Lapidot |
| 4,763,745 A | 8/1988 | Eto |
| 4,785,474 A | 11/1988 | Bernstein |
| 4,789,904 A | 12/1988 | Peterson |
| 4,794,566 A | 12/1988 | Richards |
| 4,804,937 A | 2/1989 | Barbiaux |
| 4,806,931 A | 2/1989 | Nelson |
| 4,807,096 A | 2/1989 | Skogler |
| 4,814,896 A | 3/1989 | Heitzman |
| 4,837,628 A | 6/1989 | Sasaki |
| 4,839,631 A | 6/1989 | Tsuji |
| 4,843,463 A | 6/1989 | Michetti |
| 4,843,578 A | 6/1989 | Wade |
| 4,853,856 A | 8/1989 | Hanway |
| 4,853,859 A | 8/1989 | Morita |
| 4,866,616 A | 9/1989 | Takeuchi |
| 4,876,597 A | 10/1989 | Roy |
| 4,883,349 A | 11/1989 | Mittelhauser |
| 4,896,855 A | 1/1990 | Furnish |
| 4,926,331 A | 5/1990 | Windle |
| 4,930,742 A | 6/1990 | Schofield |
| 4,936,533 A | 6/1990 | Adams |
| 4,939,652 A | 7/1990 | Steiner |
| 4,942,464 A | 7/1990 | Milatz |
| 4,945,244 A | 7/1990 | Castleman |
| 4,949,186 A | 8/1990 | Peterson |
| 4,980,913 A | 12/1990 | Skret |
| 4,987,541 A | 1/1991 | Levente |
| 4,992,943 A | 2/1991 | McCracken |
| 4,993,068 A | 2/1991 | Piosenka |
| 4,995,086 A | 2/1991 | Lilley |
| 5,012,335 A | 4/1991 | Cohodar |
| 5,027,104 A | 6/1991 | Reid |
| 5,046,007 A | 9/1991 | McCrery |
| 5,050,166 A | 9/1991 | Cantoni |
| 5,056,056 A | 10/1991 | Gustin |
| 5,057,820 A | 10/1991 | Markson |
| 5,096,287 A | 3/1992 | Kakinami |
| 5,100,095 A | 3/1992 | Haan |
| 5,111,289 A | 5/1992 | Lucas |
| 5,140,434 A | 8/1992 | Van |
| 5,140,436 A | 8/1992 | Blessinger |
| 5,144,661 A | 9/1992 | Shamosh |
| 5,178,448 A | 1/1993 | Adams |
| 5,185,700 A | 2/1993 | Bezos |
| 5,196,938 A | 3/1993 | Blessinger |
| 5,223,844 A | 6/1993 | Mansell |
| 5,224,211 A | 6/1993 | Roe |
| 5,262,813 A | 11/1993 | Scharton |
| 5,283,433 A | 2/1994 | Tsien |
| 5,294,978 A | 3/1994 | Katayama |
| 5,305,214 A | 4/1994 | Komatsu |
| 5,305,216 A | 4/1994 | Okura |
| 5,308,247 A | 5/1994 | Dyrdek |
| 5,309,485 A | 5/1994 | Chao |
| 5,311,197 A | 5/1994 | Sorden |
| 5,321,753 A | 6/1994 | Gritton |
| 5,327,288 A | 7/1994 | Wellington |
| 5,330,149 A | 7/1994 | Haan |
| 5,343,527 A | 8/1994 | Moore |
| 5,353,023 A | 10/1994 | Mitsugi |
| 5,361,326 A | 11/1994 | Aparicio |
| 5,387,926 A | 2/1995 | Bellan |
| 5,388,045 A | 2/1995 | Kamiya |
| 5,388,208 A | 2/1995 | Weingartner |
| 5,404,330 A | 4/1995 | Lee |
| 5,408,330 A | 4/1995 | Squicciarini |
| 5,422,543 A | 6/1995 | Weinberg |
| 5,430,431 A | 7/1995 | Nelson |
| 5,430,432 A | 7/1995 | Camhi |
| 5,435,184 A | 7/1995 | Pineroli |
| 5,445,024 A | 8/1995 | Riley |
| 5,445,027 A | 8/1995 | Zorner |
| 5,446,659 A | 8/1995 | Yamawaki |
| 5,455,625 A | 10/1995 | Englander |
| 5,455,716 A | 10/1995 | Suman |
| 5,465,079 A | 11/1995 | Bouchard |
| 5,473,729 A | 12/1995 | Bryant |
| 5,477,141 A | 12/1995 | Nather |
| 5,495,242 A | 2/1996 | Kick |
| 5,495,243 A | 2/1996 | McKenna |
| 5,497,419 A | 3/1996 | Hill |
| 5,499,182 A | 3/1996 | Ousborne |
| 5,504,482 A | 4/1996 | Schreder |
| 5,513,011 A | 4/1996 | Matsumoto |
| 5,515,285 A | 5/1996 | Garrett |
| 5,519,260 A | 5/1996 | Washington |
| 5,521,633 A | 5/1996 | Nakajima |
| 5,523,811 A | 6/1996 | Wada |
| 5,526,269 A | 6/1996 | Ishibashi |
| 5,530,420 A | 6/1996 | Tsuchiya |
| 5,532,678 A | 7/1996 | Kin |
| 5,537,156 A | 7/1996 | Katayama |
| 5,539,454 A | 7/1996 | Williams |
| 5,541,590 A | 7/1996 | Nishio |
| 5,544,060 A | 8/1996 | Fujii |
| 5,546,191 A | 8/1996 | Hibi |
| 5,546,305 A | 8/1996 | Kondo |

(56) References Cited

U.S. PATENT DOCUMENTS

| | | |
|---|---|---|
| 5,548,273 A | 8/1996 | Nicol |
| 5,552,990 A | 9/1996 | Ihara |
| 5,559,496 A | 9/1996 | Dubats |
| 5,568,211 A | 10/1996 | Bamford |
| 5,570,087 A | 10/1996 | Lemelson |
| 5,570,127 A | 10/1996 | Schmidt |
| 5,574,424 A | 11/1996 | Nguyen |
| 5,574,443 A | 11/1996 | Hsieh |
| D376,571 S | 12/1996 | Kokat |
| 5,581,464 A | 12/1996 | Woll |
| 5,586,130 A | 12/1996 | Doyle |
| 5,590,948 A | 1/1997 | Moreno |
| 5,596,382 A | 1/1997 | Bamford |
| 5,596,647 A | 1/1997 | Wakai |
| 5,600,775 A | 2/1997 | King |
| 5,608,272 A | 3/1997 | Tanguay |
| 5,610,580 A | 3/1997 | Lai |
| 5,612,686 A | 3/1997 | Takano |
| 5,631,638 A | 5/1997 | Kaspar |
| 5,638,273 A | 6/1997 | Coiner |
| 5,642,106 A | 6/1997 | Hancock |
| 5,646,856 A | 7/1997 | Kaesser |
| 5,652,706 A | 7/1997 | Morimoto |
| RE35,590 E | 8/1997 | Bezos |
| 5,654,892 A | 8/1997 | Fujii |
| 5,659,355 A | 8/1997 | Barron |
| 5,666,120 A | 9/1997 | Kline |
| 5,667,176 A | 9/1997 | Zamarripa |
| 5,669,698 A | 9/1997 | Veldman |
| 5,671,451 A | 9/1997 | Takahashi |
| 5,677,979 A | 10/1997 | Squicciarini |
| 5,680,117 A | 10/1997 | Arai |
| 5,680,123 A | 10/1997 | Lee |
| 5,686,765 A | 11/1997 | Washington |
| 5,686,889 A | 11/1997 | Hillis |
| 5,689,442 A | 11/1997 | Swanson |
| 5,696,705 A | 12/1997 | Zykan |
| 5,706,362 A | 1/1998 | Yabe |
| 5,706,909 A | 1/1998 | Bevins |
| 5,712,679 A | 1/1998 | Coles |
| 5,717,456 A | 2/1998 | Rudt |
| 5,719,554 A | 2/1998 | Gagnon |
| 5,758,299 A | 5/1998 | Sandborg |
| 5,781,101 A | 7/1998 | Stephen |
| 5,781,145 A | 7/1998 | Williams |
| 5,784,007 A | 7/1998 | Pepper |
| 5,784,021 A | 7/1998 | Oliva |
| 5,784,521 A | 7/1998 | Nakatani |
| 5,790,403 A | 8/1998 | Nakayama |
| 5,790,973 A | 8/1998 | Blaker |
| 5,793,308 A | 8/1998 | Rosinski |
| 5,793,420 A | 8/1998 | Schmidt |
| 5,793,739 A | 8/1998 | Tanaka |
| 5,793,985 A | 8/1998 | Natarajan |
| 5,794,165 A | 8/1998 | Minowa |
| 5,797,134 A | 8/1998 | McMillan |
| 5,798,458 A | 8/1998 | Monroe |
| 5,800,040 A | 9/1998 | Santo |
| 5,802,545 A | 9/1998 | Coverdill |
| 5,802,727 A | 9/1998 | Blank |
| 5,805,079 A | 9/1998 | Lemelson |
| 5,813,745 A | 9/1998 | Fant |
| 5,815,071 A | 9/1998 | Doyle |
| 5,815,093 A | 9/1998 | Kikinis |
| 5,819,198 A | 10/1998 | Peretz |
| 5,825,284 A | 10/1998 | Dunwoody |
| 5,825,412 A | 10/1998 | Hobson |
| 5,844,505 A | 12/1998 | Van |
| 5,845,733 A | 12/1998 | Wolfsen |
| 5,867,802 A | 2/1999 | Borza |
| 5,877,897 A | 3/1999 | Schofield |
| 5,896,167 A | 4/1999 | Omae |
| 5,897,602 A | 4/1999 | Mizuta |
| 5,897,606 A | 4/1999 | Miura |
| 5,899,956 A | 5/1999 | Chan |
| 5,901,806 A | 5/1999 | Takahashi |
| 5,914,748 A | 6/1999 | Parulski |
| 5,919,239 A | 7/1999 | Fraker |
| 5,926,210 A | 7/1999 | Hackett |
| 5,928,291 A | 7/1999 | Jenkins |
| 5,938,321 A | 8/1999 | Bos |
| 5,946,404 A | 8/1999 | Bakshi |
| 5,948,038 A | 9/1999 | Daly |
| 5,959,367 A | 9/1999 | OFarrell |
| 5,978,017 A | 11/1999 | Tino |
| 6,002,326 A | 12/1999 | Turner |
| 6,006,148 A | 12/1999 | Strong |
| 6,008,723 A | 12/1999 | Yassan |
| 6,008,841 A | 12/1999 | Charlson |
| 6,009,370 A | 12/1999 | Minowa |
| 6,011,492 A | 1/2000 | Garesche |
| RE36,590 E | 2/2000 | Yanagi |
| 6,028,528 A | 2/2000 | Lorenzetti |
| 6,037,860 A | 3/2000 | Zander |
| 6,037,977 A | 3/2000 | Peterson |
| 6,041,410 A | 3/2000 | Hsu |
| 6,049,079 A | 4/2000 | Noordam |
| 6,057,754 A | 5/2000 | Kinoshita |
| 6,060,989 A | 5/2000 | Gehlot |
| 6,064,792 A | 5/2000 | Fox |
| 6,067,488 A | 5/2000 | Tano |
| 6,076,026 A | 6/2000 | Jambhekar |
| 6,084,870 A | 7/2000 | Wooten |
| 6,088,635 A | 7/2000 | Cox et al. |
| 6,092,008 A | 7/2000 | Bateman |
| 6,092,021 A | 7/2000 | Ehlbeck |
| 6,092,193 A | 7/2000 | Loomis |
| 6,097,998 A * | 8/2000 | Lancki ............... G01L 5/28 701/34.3 |
| 6,100,811 A | 8/2000 | Hsu |
| 6,111,254 A | 8/2000 | Eden |
| 6,118,768 A | 9/2000 | Bhatia |
| 6,122,738 A | 9/2000 | Millard |
| 6,141,611 A | 10/2000 | Mackey |
| 6,144,296 A | 11/2000 | Ishida |
| 6,147,598 A | 11/2000 | Murphy |
| 6,151,065 A | 11/2000 | Steed |
| 6,163,338 A | 12/2000 | Johnson |
| 6,163,749 A | 12/2000 | McDonough |
| 6,167,186 A | 12/2000 | Kawasaki |
| 6,170,742 B1 | 1/2001 | Yacoob |
| 6,181,373 B1 | 1/2001 | Coles |
| 6,182,010 B1 | 1/2001 | Berstis |
| 6,185,490 B1 | 2/2001 | Ferguson |
| 6,195,605 B1 | 2/2001 | Tabler |
| 6,200,139 B1 | 3/2001 | Clapper |
| 6,208,919 B1 | 3/2001 | Barkesseh |
| 6,211,907 B1 | 4/2001 | Scaman |
| 6,218,960 B1 | 4/2001 | Ishikawa |
| 6,246,933 B1 | 6/2001 | Bague |
| 6,246,934 B1 | 6/2001 | Otake |
| 6,252,544 B1 | 6/2001 | Hoffberg |
| 6,253,129 B1 | 6/2001 | Jenkins |
| 6,259,475 B1 | 7/2001 | Ramachandran |
| 6,263,265 B1 | 7/2001 | Fera |
| 6,266,588 B1 | 7/2001 | McClellan |
| 6,298,290 B1 | 10/2001 | Abe et al. |
| 6,300,875 B1 | 10/2001 | Schafer |
| 6,324,450 B1 | 11/2001 | Iwama |
| 6,333,759 B1 | 12/2001 | Mazzilli |
| 6,337,622 B1 | 1/2002 | Sugano |
| 6,349,250 B1 | 2/2002 | Hart |
| 6,353,734 B1 | 3/2002 | Wright |
| 6,356,823 B1 | 3/2002 | Iannotti |
| 6,360,147 B1 | 3/2002 | Lee |
| 6,366,207 B1 | 4/2002 | Murphy |
| 6,389,339 B1 | 5/2002 | Just |
| 6,389,340 B1 | 5/2002 | Rayner |
| 6,400,835 B1 | 6/2002 | Lemelson |
| 6,405,112 B1 | 6/2002 | Rayner |
| 6,405,132 B1 | 6/2002 | Breed |
| 6,408,232 B1 | 6/2002 | Cannon |
| 6,411,874 B2 | 6/2002 | Morgan |
| 6,421,080 B1 | 7/2002 | Lambert |

(56) References Cited

U.S. PATENT DOCUMENTS

| | | |
|---|---|---|
| 6,434,510 B1 | 8/2002 | Callaghan |
| 6,449,540 B1 | 9/2002 | Rayner |
| 6,456,321 B1 | 9/2002 | Ito |
| 6,459,988 B1 | 10/2002 | Fan |
| 6,470,241 B2 | 10/2002 | Yoshikawa |
| 6,472,771 B1 | 10/2002 | Frese et al. |
| 6,490,513 B1 | 12/2002 | Fish |
| 6,493,650 B1 | 12/2002 | Rodgers |
| 6,505,106 B1 | 1/2003 | Lawrence |
| 6,507,838 B1 | 1/2003 | Syeda-Mahmood |
| 6,508,400 B1 | 1/2003 | Ishifuji |
| 6,516,256 B1 | 2/2003 | Hartmann |
| 6,518,881 B2 | 2/2003 | Monroe |
| 6,525,672 B2 | 2/2003 | Chainer |
| 6,529,159 B1 | 3/2003 | Fan |
| 6,535,804 B1 | 3/2003 | Chun |
| 6,552,682 B2 | 4/2003 | Fan |
| 6,556,905 B1 | 4/2003 | Mittelsteadt et al. |
| 6,559,769 B2 | 5/2003 | Anthony |
| 6,574,538 B2 | 6/2003 | Sasaki |
| 6,575,902 B1 | 6/2003 | Burton |
| 6,580,373 B1 | 6/2003 | Ohashi |
| 6,580,983 B2 | 6/2003 | Laguer-Diaz |
| 6,593,848 B1 | 7/2003 | Atkins |
| 6,594,576 B2 | 7/2003 | Fan |
| 6,611,740 B2 | 8/2003 | Lowrey et al. |
| 6,611,755 B1 | 8/2003 | Coffee |
| 6,624,611 B2 | 9/2003 | Kirmuss |
| 6,629,029 B1 | 9/2003 | Giles |
| 6,629,030 B2 | 9/2003 | Klausner |
| 6,636,791 B2 | 10/2003 | Okada |
| 6,664,922 B1 | 12/2003 | Fan |
| 6,665,613 B2 | 12/2003 | Duvall |
| 6,679,702 B1 | 1/2004 | Rau |
| 6,684,137 B2 | 1/2004 | Takagi |
| 6,694,483 B1 | 2/2004 | Nagata |
| 6,701,234 B1 | 3/2004 | Vogelsang |
| 6,714,894 B1 | 3/2004 | Tobey |
| 6,718,239 B2 | 4/2004 | Rayner |
| 6,721,640 B2 | 4/2004 | Glenn |
| 6,721,652 B1 | 4/2004 | Sanqunetti |
| 6,728,612 B1 | 4/2004 | Carver et al. |
| 6,732,031 B1 | 5/2004 | Lightner |
| 6,732,032 B1 | 5/2004 | Banet et al. |
| 6,735,503 B2 | 5/2004 | Ames |
| 6,737,954 B2 | 5/2004 | Chainer et al. |
| 6,738,697 B2 | 5/2004 | Breed |
| 6,739,078 B2 | 5/2004 | Morley et al. |
| 6,741,168 B2 | 5/2004 | Webb |
| 6,745,153 B2 | 6/2004 | White |
| 6,747,692 B2 | 6/2004 | Patel |
| 6,748,305 B1 | 6/2004 | Klausner |
| 6,760,757 B1 | 7/2004 | Lundberg et al. |
| 6,762,513 B2 | 7/2004 | Landgraf |
| 6,779,716 B1 | 8/2004 | Grow |
| 6,795,017 B1 | 9/2004 | Puranik |
| 6,795,111 B1 | 9/2004 | Mazzilli |
| 6,795,759 B2 | 9/2004 | Doyle |
| 6,798,743 B1 | 9/2004 | Ma |
| 6,804,590 B2 | 10/2004 | Sato |
| 6,810,362 B2 | 10/2004 | Adachi et al. |
| 6,812,831 B2 | 11/2004 | Ikeda |
| 6,819,989 B2 | 11/2004 | Maeda et al. |
| 6,831,556 B1 | 12/2004 | Boykin |
| 6,832,140 B2 | 12/2004 | Fan |
| 6,832,141 B2 | 12/2004 | Skeen et al. |
| 6,836,712 B2 | 12/2004 | Nishina |
| 6,842,762 B2 | 1/2005 | Raither et al. |
| 6,847,873 B1 | 1/2005 | Li |
| 6,850,823 B2 | 2/2005 | Eun et al. |
| 6,859,695 B2 | 2/2005 | Klausner |
| 6,859,705 B2 | 2/2005 | Rao |
| 6,862,524 B1 | 3/2005 | Nagda |
| 6,865,457 B1 | 3/2005 | Mittelsteadt et al. |
| 6,867,733 B2 | 3/2005 | Sandhu |
| 6,873,261 B2 | 3/2005 | Anthony |
| 6,882,313 B1 | 4/2005 | Fan |
| 6,882,912 B2 | 4/2005 | DiLodovico |
| 6,894,606 B2 | 5/2005 | Forbes |
| 6,895,248 B1 | 5/2005 | Akyol |
| 6,898,492 B2 | 5/2005 | de Leon et al. |
| 6,898,493 B2 | 5/2005 | Ehrman |
| 6,919,823 B1 | 7/2005 | Lock |
| 6,922,566 B2 | 7/2005 | Puranik |
| 6,928,348 B1 | 8/2005 | Lightner et al. |
| 6,931,309 B2 | 8/2005 | Phelan |
| 6,947,817 B2 | 9/2005 | Diem |
| 6,950,122 B1 | 9/2005 | Mirabile |
| 6,954,223 B2 | 10/2005 | Miyazawa |
| 6,988,034 B1 | 1/2006 | Marlatt |
| 7,003,289 B1 | 2/2006 | Kolls |
| 7,012,632 B2 | 3/2006 | Freeman |
| 7,020,548 B2 | 3/2006 | Saito |
| 7,023,333 B2 | 4/2006 | Blanco |
| 7,039,510 B2 | 5/2006 | Gumpinger |
| 7,076,348 B2 | 7/2006 | Bucher |
| 7,079,927 B1 | 7/2006 | Tano |
| 7,082,359 B2 | 7/2006 | Breed |
| 7,082,382 B1 | 7/2006 | Rose et al. |
| 7,088,387 B1 | 8/2006 | Freeman |
| 7,095,782 B1 | 8/2006 | Cohen |
| 7,098,812 B2 | 8/2006 | Hirota |
| 7,100,190 B2 | 8/2006 | Johnson |
| 7,113,853 B2 | 9/2006 | Hecklinger |
| 7,117,075 B1 | 10/2006 | Larschan |
| 7,119,832 B2 | 10/2006 | Blanco |
| 7,138,904 B1 | 11/2006 | Dutu |
| 7,155,321 B2 | 12/2006 | Bromley |
| 7,177,738 B2 | 2/2007 | Diaz |
| 7,209,833 B2 | 4/2007 | Isaji |
| 7,239,252 B2 | 7/2007 | Kato |
| 7,254,482 B2 | 8/2007 | Kawasaki |
| 7,265,663 B2 * | 9/2007 | Steele ..................... A63F 13/10 340/426.25 |
| 7,266,507 B2 | 9/2007 | Simon |
| 7,272,179 B2 | 9/2007 | Siemens |
| 7,308,341 B2 | 12/2007 | Schofield et al. |
| 7,317,974 B2 | 1/2008 | Luskin |
| 7,343,306 B1 | 3/2008 | Bates |
| 7,348,895 B2 | 3/2008 | Lagassey |
| 7,349,027 B2 | 3/2008 | Endo |
| 7,370,261 B2 | 5/2008 | Winarski |
| 7,382,933 B2 | 6/2008 | Dorai |
| 7,386,376 B2 | 6/2008 | Basir |
| 7,389,178 B2 | 6/2008 | Raz |
| 7,457,693 B2 | 11/2008 | Olsen |
| 7,471,189 B2 | 12/2008 | Vastad |
| 7,471,192 B2 | 12/2008 | Hara |
| 7,536,457 B2 | 5/2009 | Miller |
| 7,548,586 B1 | 6/2009 | Mimar |
| 7,561,054 B2 | 7/2009 | Raz |
| 7,584,033 B2 | 9/2009 | Mittelsteadt |
| 7,623,754 B1 | 11/2009 | McKain |
| 7,659,827 B2 | 2/2010 | Gunderson et al. |
| 7,659,835 B2 | 2/2010 | Jung |
| 7,667,731 B2 | 2/2010 | Kreiner |
| 7,689,001 B2 | 3/2010 | Kim |
| 7,702,442 B2 | 4/2010 | Takenaka |
| 7,725,216 B2 * | 5/2010 | Kim ..................... G07C 5/008 701/1 |
| 7,768,548 B2 | 8/2010 | Silvernail |
| 7,769,499 B2 | 8/2010 | McQuade |
| 7,783,956 B2 | 8/2010 | Ko |
| 7,804,426 B2 | 9/2010 | Etcheson |
| 7,821,421 B2 | 10/2010 | Tamir |
| 7,845,560 B2 | 12/2010 | Emanuel |
| 7,853,376 B2 | 12/2010 | Peng |
| 7,868,912 B2 | 1/2011 | Venetianer |
| 7,893,958 B1 | 2/2011 | DAgostino |
| 7,940,250 B2 | 5/2011 | Forstall |
| 7,941,258 B1 | 5/2011 | Mittelsteadt |
| 7,974,748 B2 | 7/2011 | Goerick |
| 8,054,168 B2 | 11/2011 | McCormick |
| 8,068,979 B2 | 11/2011 | Breed |

(56) References Cited

U.S. PATENT DOCUMENTS

| | | |
|---|---|---|
| 8,090,598 B2 | 1/2012 | Bauer |
| 8,113,844 B2 * | 2/2012 | Huang et al. ............... 434/262 |
| 8,139,820 B2 | 3/2012 | Plante |
| 8,140,265 B2 | 3/2012 | Grush |
| 8,140,358 B1 | 3/2012 | Ling |
| 8,152,198 B2 | 4/2012 | Breed |
| 8,239,092 B2 | 8/2012 | Plante |
| 8,269,617 B2 | 9/2012 | Cook |
| 8,311,858 B2 | 11/2012 | Everett |
| 8,314,708 B2 | 11/2012 | Gunderson |
| 8,321,066 B2 | 11/2012 | Becker |
| 8,373,567 B2 | 2/2013 | Denson |
| 8,417,562 B1 | 4/2013 | Siemens |
| 8,442,690 B2 | 5/2013 | Goldstein |
| 8,471,701 B2 | 6/2013 | Yariv |
| 8,508,353 B2 | 8/2013 | Cook |
| 8,538,696 B1 | 9/2013 | Cassanova |
| 8,538,785 B2 | 9/2013 | Coleman |
| 8,564,426 B2 | 10/2013 | Cook |
| 8,564,446 B2 | 10/2013 | Gunderson |
| 8,571,755 B2 | 10/2013 | Plante |
| 8,577,703 B2 | 11/2013 | McClellan |
| 8,606,492 B1 | 12/2013 | Botnen |
| 8,634,958 B1 | 1/2014 | Chiappetta |
| 8,635,557 B2 * | 1/2014 | Geise et al. ............... 715/850 |
| 8,676,428 B2 | 3/2014 | Richardson |
| 8,744,642 B2 | 6/2014 | Nemat-Nasser |
| 8,775,067 B2 | 7/2014 | Cho |
| 8,781,292 B1 | 7/2014 | Ross |
| 8,803,695 B2 | 8/2014 | Denson |
| 8,805,110 B2 | 8/2014 | Rhoads |
| 8,849,501 B2 | 9/2014 | Cook |
| 8,855,847 B2 | 10/2014 | Uehara |
| 8,862,395 B2 | 10/2014 | Richardson |
| 8,868,288 B2 | 10/2014 | Plante |
| 8,880,279 B2 | 11/2014 | Plante |
| 8,892,310 B1 | 11/2014 | Palmer |
| 8,989,959 B2 | 3/2015 | Plante |
| 8,996,234 B1 | 3/2015 | Tamari |
| 8,996,240 B2 | 3/2015 | Plante |
| 9,047,721 B1 | 6/2015 | Botnen |
| 9,085,362 B1 | 7/2015 | Kilian |
| 9,183,679 B2 | 11/2015 | Plante |
| 9,201,842 B2 | 12/2015 | Plante |
| 9,208,129 B2 | 12/2015 | Plante |
| 9,226,004 B1 | 12/2015 | Plante |
| 9,240,079 B2 | 1/2016 | Lambert |
| 9,607,526 B1 | 3/2017 | Hsu-Hoffman |
| 2001/0005217 A1 | 6/2001 | Hamilton |
| 2001/0005804 A1 | 6/2001 | Rayner |
| 2001/0018628 A1 | 8/2001 | Jenkins |
| 2001/0020204 A1 | 9/2001 | Runyon |
| 2001/0052730 A1 | 12/2001 | Baur |
| 2002/0019689 A1 | 2/2002 | Harrison |
| 2002/0027502 A1 | 3/2002 | Mayor |
| 2002/0029109 A1 | 3/2002 | Wong |
| 2002/0035422 A1 | 3/2002 | Sasaki |
| 2002/0044225 A1 | 4/2002 | Rakib |
| 2002/0059453 A1 | 5/2002 | Eriksson |
| 2002/0061758 A1 | 5/2002 | Zarlengo |
| 2002/0067076 A1 | 6/2002 | Talbot |
| 2002/0087240 A1 | 7/2002 | Raithel |
| 2002/0091473 A1 | 7/2002 | Gardner et al. |
| 2002/0105438 A1 | 8/2002 | Forbes |
| 2002/0107619 A1 | 8/2002 | Klausner |
| 2002/0111725 A1 | 8/2002 | Burge |
| 2002/0111756 A1 | 8/2002 | Modgil |
| 2002/0118206 A1 | 8/2002 | Knittel |
| 2002/0120374 A1 | 8/2002 | Douros |
| 2002/0135679 A1 | 9/2002 | Scaman |
| 2002/0138587 A1 * | 9/2002 | Koehler et al. ............... 709/207 |
| 2002/0163532 A1 | 11/2002 | Thomas |
| 2002/0169529 A1 | 11/2002 | Kim |
| 2002/0169530 A1 | 11/2002 | Laguer Diaz et al. |
| 2002/0183905 A1 | 12/2002 | Maeda et al. |
| 2003/0016753 A1 | 1/2003 | Kim |
| 2003/0028298 A1 | 2/2003 | Macky et al. |
| 2003/0053433 A1 | 3/2003 | Chun |
| 2003/0055557 A1 | 3/2003 | Dutta |
| 2003/0065805 A1 | 4/2003 | Barnes |
| 2003/0067541 A1 | 4/2003 | Joao |
| 2003/0079041 A1 | 4/2003 | Parrella |
| 2003/0080713 A1 | 5/2003 | Kirmuss |
| 2003/0080878 A1 | 5/2003 | Kirmuss |
| 2003/0081121 A1 | 5/2003 | Kirmuss |
| 2003/0081122 A1 | 5/2003 | Kirmuss |
| 2003/0081127 A1 | 5/2003 | Kirmuss |
| 2003/0081128 A1 | 5/2003 | Kirmuss |
| 2003/0081934 A1 | 5/2003 | Kirmuss |
| 2003/0081935 A1 | 5/2003 | Kirmuss |
| 2003/0095688 A1 | 5/2003 | Kirmuss |
| 2003/0112133 A1 | 6/2003 | Webb |
| 2003/0125854 A1 | 7/2003 | Kawasaki |
| 2003/0144775 A1 | 7/2003 | Klausner |
| 2003/0152145 A1 | 8/2003 | Kawakita |
| 2003/0154009 A1 * | 8/2003 | Basir ............... B62D 41/00 701/32.2 |
| 2003/0158638 A1 | 8/2003 | Yakes |
| 2003/0177187 A1 | 9/2003 | Levine |
| 2003/0187704 A1 | 10/2003 | Hashiguchi |
| 2003/0191568 A1 | 10/2003 | Breed |
| 2003/0195678 A1 | 10/2003 | Betters et al. |
| 2003/0214585 A1 | 11/2003 | Bakewell |
| 2003/0220835 A1 | 11/2003 | Barnes |
| 2003/0222880 A1 | 12/2003 | Waterman |
| 2004/0008255 A1 | 1/2004 | Lewellen |
| 2004/0033058 A1 | 2/2004 | Reich |
| 2004/0039503 A1 | 2/2004 | Doyle |
| 2004/0039504 A1 | 2/2004 | Coffee |
| 2004/0044452 A1 | 3/2004 | Bauer et al. |
| 2004/0044592 A1 | 3/2004 | Ubik |
| 2004/0054444 A1 | 3/2004 | Abeska |
| 2004/0054513 A1 | 3/2004 | Laird |
| 2004/0054689 A1 | 3/2004 | Salmonsen |
| 2004/0064245 A1 | 4/2004 | Knockeart |
| 2004/0070926 A1 | 4/2004 | Boykin et al. |
| 2004/0083041 A1 | 4/2004 | Skeen et al. |
| 2004/0088090 A1 | 5/2004 | Wee |
| 2004/0103008 A1 | 5/2004 | Wahlbin |
| 2004/0103010 A1 | 5/2004 | Wahlbin |
| 2004/0104842 A1 | 6/2004 | Drury |
| 2004/0111189 A1 | 6/2004 | Miyazawa |
| 2004/0117638 A1 | 6/2004 | Monroe |
| 2004/0138794 A1 | 7/2004 | Saito et al. |
| 2004/0145457 A1 | 7/2004 | Schofield et al. |
| 2004/0153244 A1 | 8/2004 | Kellum |
| 2004/0153362 A1 | 8/2004 | Bauer |
| 2004/0167689 A1 | 8/2004 | Bromley |
| 2004/0179600 A1 | 9/2004 | Wells |
| 2004/0181326 A1 | 9/2004 | Adams |
| 2004/0184548 A1 | 9/2004 | Kerbiriou |
| 2004/0203903 A1 | 10/2004 | Wilson |
| 2004/0209594 A1 | 10/2004 | Naboulsi |
| 2004/0210353 A1 | 10/2004 | Rice |
| 2004/0230345 A1 | 11/2004 | Tzamaloukas |
| 2004/0230370 A1 | 11/2004 | Tzamaloukas |
| 2004/0230373 A1 | 11/2004 | Tzamaloukas |
| 2004/0230374 A1 | 11/2004 | Tzamaloukas |
| 2004/0233284 A1 | 11/2004 | Lesesky |
| 2004/0236474 A1 | 11/2004 | Chowdhary |
| 2004/0243285 A1 | 12/2004 | Gounder |
| 2004/0243308 A1 | 12/2004 | Irish |
| 2004/0243668 A1 | 12/2004 | Harjanto |
| 2004/0254689 A1 | 12/2004 | Blazic et al. |
| 2004/0254698 A1 | 12/2004 | Hubbard |
| 2005/0021199 A1 | 1/2005 | Zimmerman |
| 2005/0043869 A1 | 2/2005 | Funkhouser |
| 2005/0060070 A1 | 3/2005 | Kapolka |
| 2005/0060071 A1 | 3/2005 | Winner |
| 2005/0065682 A1 | 3/2005 | Kapadia |
| 2005/0065716 A1 | 3/2005 | Timko |
| 2005/0073585 A1 | 4/2005 | Ettinger |
| 2005/0078423 A1 | 4/2005 | Kim |
| 2005/0088291 A1 | 4/2005 | Blanco |

(56) References Cited

U.S. PATENT DOCUMENTS

| | | |
|---|---|---|
| 2005/0099498 A1 | 5/2005 | Lao et al. |
| 2005/0100329 A1 | 5/2005 | Lao et al. |
| 2005/0102074 A1 | 5/2005 | Kolls |
| 2005/0125117 A1 | 6/2005 | Breed |
| 2005/0131585 A1 | 6/2005 | Luskin |
| 2005/0131595 A1 | 6/2005 | Luskin et al. |
| 2005/0131597 A1 | 6/2005 | Raz |
| 2005/0136949 A1 | 6/2005 | Barnes |
| 2005/0137757 A1 | 6/2005 | Phelan |
| 2005/0137796 A1 | 6/2005 | Gumpinger |
| 2005/0146458 A1 | 7/2005 | Carmichael |
| 2005/0149238 A1 | 7/2005 | Stefani |
| 2005/0149259 A1 | 7/2005 | Cherveny |
| 2005/0152353 A1 | 7/2005 | Couturier |
| 2005/0159964 A1 | 7/2005 | Sonnenrein |
| 2005/0166258 A1 | 7/2005 | Vasilevsky |
| 2005/0168258 A1 | 8/2005 | Poskatcheev |
| 2005/0171692 A1 | 8/2005 | Hamblen |
| 2005/0174217 A1 | 8/2005 | Basir |
| 2005/0182538 A1 | 8/2005 | Phelan |
| 2005/0182824 A1 | 8/2005 | Cotte |
| 2005/0185052 A1 | 8/2005 | Raisinghani |
| 2005/0185936 A9 | 8/2005 | Lao |
| 2005/0192749 A1 | 9/2005 | Flann |
| 2005/0197748 A1 | 9/2005 | Holst |
| 2005/0200714 A1 | 9/2005 | Marchese |
| 2005/0203683 A1 | 9/2005 | Olsen |
| 2005/0206741 A1 | 9/2005 | Raber |
| 2005/0209776 A1 | 9/2005 | Ogino |
| 2005/0212920 A1 | 9/2005 | Evans |
| 2005/0216144 A1 | 9/2005 | Baldassa |
| 2005/0228560 A1 | 10/2005 | Doherty |
| 2005/0233805 A1 | 10/2005 | Okajima |
| 2005/0251304 A1 | 11/2005 | Cancellara |
| 2005/0256681 A1 | 11/2005 | Brinton |
| 2005/0258942 A1 | 11/2005 | Manasseh |
| 2005/0264691 A1 | 12/2005 | Endo |
| 2005/0283284 A1 | 12/2005 | Grenier |
| 2006/0001671 A1 | 1/2006 | Kamijo |
| 2006/0007151 A1 | 1/2006 | Ram |
| 2006/0011399 A1 | 1/2006 | Brockway |
| 2006/0015233 A1 | 1/2006 | Olsen |
| 2006/0022842 A1 | 2/2006 | Zoladek |
| 2006/0025897 A1 | 2/2006 | Shostak |
| 2006/0030986 A1 | 2/2006 | Peng |
| 2006/0040239 A1 | 2/2006 | Cummins |
| 2006/0047380 A1 | 3/2006 | Welch |
| 2006/0053038 A1 | 3/2006 | Warren |
| 2006/0055521 A1 | 3/2006 | Blanco |
| 2006/0057543 A1 | 3/2006 | Roald |
| 2006/0058950 A1 | 3/2006 | Kato |
| 2006/0072792 A1 | 4/2006 | Toda |
| 2006/0078853 A1 | 4/2006 | Lanktree |
| 2006/0082438 A1 | 4/2006 | Bazakos |
| 2006/0092043 A1 | 5/2006 | Lagassey |
| 2006/0095175 A1 | 5/2006 | deWaal et al. |
| 2006/0095199 A1 | 5/2006 | Lagassey |
| 2006/0095349 A1 | 5/2006 | Morgan |
| 2006/0103127 A1 | 5/2006 | Lie |
| 2006/0106514 A1 | 5/2006 | Liebl |
| 2006/0111817 A1 | 5/2006 | Phelan |
| 2006/0122749 A1 | 6/2006 | Phelan |
| 2006/0129578 A1 | 6/2006 | Kim |
| 2006/0142913 A1 | 6/2006 | Coffee |
| 2006/0143435 A1 | 6/2006 | Kwon |
| 2006/0147187 A1 | 7/2006 | Takemoto |
| 2006/0161960 A1 | 7/2006 | Benoit |
| 2006/0168271 A1 | 7/2006 | Pabari |
| 2006/0178793 A1 | 8/2006 | Hecklinger |
| 2006/0180647 A1 | 8/2006 | Hansen |
| 2006/0184295 A1 | 8/2006 | Hawkins |
| 2006/0192658 A1 | 8/2006 | Yamamura |
| 2006/0200008 A1 | 9/2006 | Moore-Ede |
| 2006/0200305 A1 | 9/2006 | Sheha |
| 2006/0204059 A1 | 9/2006 | Ido |
| 2006/0209090 A1 | 9/2006 | Kelly et al. |
| 2006/0209840 A1 | 9/2006 | Paatela |
| 2006/0212195 A1 | 9/2006 | Veith |
| 2006/0215884 A1 | 9/2006 | Ota |
| 2006/0226344 A1 | 10/2006 | Werth |
| 2006/0229780 A1 | 10/2006 | Underdahl |
| 2006/0242680 A1 | 10/2006 | Johnson |
| 2006/0247833 A1 | 11/2006 | Malhotra |
| 2006/0253307 A1 | 11/2006 | Warren |
| 2006/0259218 A1 | 11/2006 | Wu |
| 2006/0261931 A1 | 11/2006 | Cheng |
| 2007/0001831 A1 | 1/2007 | Raz |
| 2007/0005404 A1 | 1/2007 | Raz |
| 2007/0027583 A1 | 2/2007 | Tamir |
| 2007/0027726 A1 | 2/2007 | Warren |
| 2007/0035632 A1 | 2/2007 | Silvernail |
| 2007/0043487 A1 | 2/2007 | Krzystofczyk |
| 2007/0100509 A1 | 5/2007 | Piekarz |
| 2007/0120948 A1 | 5/2007 | Fujioka |
| 2007/0124332 A1 | 5/2007 | Ballesty |
| 2007/0127833 A1 | 6/2007 | Singh |
| 2007/0132773 A1 | 6/2007 | Plante |
| 2007/0135979 A1 | 6/2007 | Plante |
| 2007/0135980 A1 | 6/2007 | Plante |
| 2007/0136078 A1 | 6/2007 | Plante |
| 2007/0142986 A1 | 6/2007 | Alaous |
| 2007/0143499 A1 | 6/2007 | Chang |
| 2007/0150138 A1 | 6/2007 | Plante |
| 2007/0150140 A1 | 6/2007 | Seymour |
| 2007/0173994 A1 | 7/2007 | Kubo |
| 2007/0179691 A1 | 8/2007 | Grenn |
| 2007/0183635 A1 | 8/2007 | Weidhaas |
| 2007/0208494 A1 | 9/2007 | Chapman |
| 2007/0213920 A1* | 9/2007 | Igarashi ............... F02D 29/02 701/114 |
| 2007/0216521 A1 | 9/2007 | Guensler |
| 2007/0219685 A1 | 9/2007 | Plante |
| 2007/0219686 A1 | 9/2007 | Plante |
| 2007/0236474 A1 | 10/2007 | Ramstein |
| 2007/0241874 A1 | 10/2007 | Okpysh |
| 2007/0244614 A1 | 10/2007 | Nathanson |
| 2007/0253307 A1 | 11/2007 | Mashimo |
| 2007/0257781 A1 | 11/2007 | Denson |
| 2007/0257782 A1 | 11/2007 | Etcheson |
| 2007/0257804 A1 | 11/2007 | Gunderson et al. |
| 2007/0257815 A1 | 11/2007 | Gunderson |
| 2007/0260677 A1 | 11/2007 | DeMarco |
| 2007/0262855 A1 | 11/2007 | Zuta |
| 2007/0263984 A1* | 11/2007 | Sterner ............... G11B 27/034 386/234 |
| 2007/0268158 A1 | 11/2007 | Gunderson et al. |
| 2007/0271105 A1 | 11/2007 | Gunderson |
| 2007/0273480 A1 | 11/2007 | Burkman |
| 2007/0279214 A1 | 12/2007 | Buehler |
| 2007/0280677 A1 | 12/2007 | Drake et al. |
| 2007/0299612 A1 | 12/2007 | Kimura |
| 2008/0035108 A1 | 2/2008 | Ancimer |
| 2008/0059019 A1 | 3/2008 | Delia |
| 2008/0071827 A1 | 3/2008 | Hengel |
| 2008/0111666 A1 | 5/2008 | Plante |
| 2008/0122603 A1 | 5/2008 | Plante |
| 2008/0137912 A1 | 6/2008 | Kim |
| 2008/0143834 A1 | 6/2008 | Comeau |
| 2008/0147267 A1 | 6/2008 | Plante et al. |
| 2008/0157510 A1 | 7/2008 | Breed |
| 2008/0167775 A1 | 7/2008 | Kuttenberger |
| 2008/0169914 A1 | 7/2008 | Albertson |
| 2008/0177436 A1 | 7/2008 | Fortson |
| 2008/0195261 A1 | 8/2008 | Breed |
| 2008/0204556 A1 | 8/2008 | de Miranda |
| 2008/0211779 A1 | 9/2008 | Pryor |
| 2008/0234920 A1 | 9/2008 | Nurminen |
| 2008/0243389 A1 | 10/2008 | Inoue |
| 2008/0252412 A1 | 10/2008 | Larsson |
| 2008/0252485 A1 | 10/2008 | Lagassey |
| 2008/0252487 A1 | 10/2008 | McClellan |
| 2008/0269978 A1 | 10/2008 | Shirole |
| 2008/0281485 A1 | 11/2008 | Plante |

(56) References Cited

U.S. PATENT DOCUMENTS

| | | | |
|---|---|---|---|
| 2008/0309762 A1* | 12/2008 | Howard | G07C 5/0891 |
| | | | 348/148 |
| 2008/0319604 A1 | 12/2008 | Follmer | |
| 2009/0009321 A1 | 1/2009 | McClellan | |
| 2009/0043500 A1* | 2/2009 | Satoh | 701/210 |
| 2009/0043971 A1 | 2/2009 | Kim | |
| 2009/0051510 A1 | 2/2009 | Follmer | |
| 2009/0138191 A1 | 5/2009 | Engelhard | |
| 2009/0157255 A1 | 6/2009 | Plante | |
| 2009/0216775 A1* | 8/2009 | Ratliff | G06Q 10/08 |
| 2009/0224869 A1 | 9/2009 | Baker | |
| 2009/0290848 A1 | 11/2009 | Brown | |
| 2009/0299622 A1 | 12/2009 | Denaro | |
| 2009/0312998 A1 | 12/2009 | Berckmans | |
| 2009/0326796 A1 | 12/2009 | Prokhorov | |
| 2009/0327856 A1* | 12/2009 | Mouilleseaux | G06F 17/30781 |
| | | | 715/230 |
| 2010/0030423 A1 | 2/2010 | Nathanson | |
| 2010/0045451 A1 | 2/2010 | Periwal | |
| 2010/0047756 A1 | 2/2010 | Schneider | |
| 2010/0049516 A1 | 2/2010 | Talwar | |
| 2010/0054709 A1 | 3/2010 | Misawa | |
| 2010/0057342 A1* | 3/2010 | Muramatsu | 701/201 |
| 2010/0063672 A1 | 3/2010 | Anderson | |
| 2010/0063680 A1 | 3/2010 | Tolstedt | |
| 2010/0063850 A1 | 3/2010 | Daniel | |
| 2010/0070175 A1 | 3/2010 | Soulchin | |
| 2010/0076621 A1 | 3/2010 | Kubotani | |
| 2010/0085193 A1 | 4/2010 | Boss | |
| 2010/0085430 A1 | 4/2010 | Kreiner | |
| 2010/0087984 A1 | 4/2010 | Joseph | |
| 2010/0100315 A1 | 4/2010 | Davidson | |
| 2010/0103165 A1 | 4/2010 | Lee | |
| 2010/0104199 A1 | 4/2010 | Zhang | |
| 2010/0149418 A1 | 6/2010 | Freed | |
| 2010/0153146 A1 | 6/2010 | Angell | |
| 2010/0157061 A1 | 6/2010 | Katsman | |
| 2010/0191411 A1 | 7/2010 | Cook | |
| 2010/0201875 A1 | 8/2010 | Rood | |
| 2010/0220892 A1 | 9/2010 | Kawakubo | |
| 2010/0250020 A1 | 9/2010 | Lee | |
| 2010/0250021 A1 | 9/2010 | Cook | |
| 2010/0250022 A1 | 9/2010 | Hines | |
| 2010/0250060 A1 | 9/2010 | Maeda | |
| 2010/0250116 A1 | 9/2010 | Yamaguchi | |
| 2010/0253918 A1 | 10/2010 | Seder | |
| 2010/0268415 A1 | 10/2010 | Ishikawa | |
| 2010/0283633 A1 | 11/2010 | Becker | |
| 2010/0312464 A1 | 12/2010 | Fitzgerald | |
| 2011/0035139 A1 | 2/2011 | Konlditslotis | |
| 2011/0043624 A1 | 2/2011 | Haug | |
| 2011/0060496 A1 | 3/2011 | Nielsen | |
| 2011/0077028 A1 | 3/2011 | Wilkes | |
| 2011/0091079 A1 | 4/2011 | Yu-Song | |
| 2011/0093159 A1 | 4/2011 | Boling | |
| 2011/0112995 A1 | 5/2011 | Chang | |
| 2011/0121960 A1 | 5/2011 | Tsai | |
| 2011/0125365 A1 | 5/2011 | Larschan | |
| 2011/0130916 A1 | 6/2011 | Mayer | |
| 2011/0140884 A1 | 6/2011 | Santiago | |
| 2011/0145042 A1 | 6/2011 | Green | |
| 2011/0153367 A1 | 6/2011 | Amigo | |
| 2011/0161116 A1 | 6/2011 | Peak | |
| 2011/0166773 A1 | 7/2011 | Raz | |
| 2011/0172864 A1 | 7/2011 | Syed | |
| 2011/0173015 A1 | 7/2011 | Chapman | |
| 2011/0208428 A1* | 8/2011 | Matsubara | G01C 21/367 |
| | | | 701/532 |
| 2011/0212717 A1 | 9/2011 | Rhoads | |
| 2011/0213628 A1 | 9/2011 | Peak | |
| 2011/0224891 A1 | 9/2011 | Iwuchukwu | |
| 2011/0251752 A1 | 10/2011 | DeLarocheliere | |
| 2011/0251782 A1 | 10/2011 | Perkins | |
| 2011/0254676 A1 | 10/2011 | Marumoto | |
| 2011/0257882 A1 | 10/2011 | McBurney | |
| 2011/0273568 A1 | 11/2011 | Lagassey | |
| 2011/0282542 A9 | 11/2011 | Nielsen | |
| 2011/0283223 A1* | 11/2011 | Vaittinen | G01C 21/3647 |
| | | | 715/781 |
| 2011/0304446 A1 | 12/2011 | Basson | |
| 2012/0021386 A1 | 1/2012 | Anderson | |
| 2012/0035788 A1 | 2/2012 | Trepagnier | |
| 2012/0041675 A1* | 2/2012 | Juliver | G06Q 10/08 |
| | | | 701/465 |
| 2012/0046803 A1 | 2/2012 | Inou | |
| 2012/0071140 A1 | 3/2012 | Oesterling | |
| 2012/0078063 A1 | 3/2012 | Moore-Ede | |
| 2012/0081567 A1 | 4/2012 | Cote | |
| 2012/0100509 A1 | 4/2012 | Gunderson | |
| 2012/0109447 A1 | 5/2012 | Yousefi | |
| 2012/0123806 A1 | 5/2012 | Schumann | |
| 2012/0134547 A1 | 5/2012 | Jung | |
| 2012/0150436 A1* | 6/2012 | Rossano et al. | 701/450 |
| 2012/0176234 A1 | 7/2012 | Taneyhill | |
| 2012/0190001 A1 | 7/2012 | Knight | |
| 2012/0198317 A1 | 8/2012 | Eppolito | |
| 2012/0210252 A1 | 8/2012 | Fedoseyeva | |
| 2012/0277950 A1 | 11/2012 | Plante | |
| 2012/0280835 A1 | 11/2012 | Raz | |
| 2012/0283895 A1 | 11/2012 | Noda | |
| 2012/0330528 A1 | 12/2012 | Schwindt | |
| 2013/0004138 A1* | 1/2013 | Kilar | H04N 21/4756 |
| | | | 386/230 |
| 2013/0006469 A1 | 1/2013 | Green | |
| 2013/0021148 A1 | 1/2013 | Cook | |
| 2013/0028320 A1 | 1/2013 | Gardner | |
| 2013/0030660 A1 | 1/2013 | Fujimoto | |
| 2013/0073112 A1 | 3/2013 | Phelan | |
| 2013/0073114 A1 | 3/2013 | Nemat-Nasser | |
| 2013/0096731 A1 | 4/2013 | Tamari | |
| 2013/0127980 A1 | 5/2013 | Haddick | |
| 2013/0145269 A1 | 6/2013 | Latulipe | |
| 2013/0151980 A1 | 6/2013 | Lee | |
| 2013/0170762 A1 | 7/2013 | Marti | |
| 2013/0197774 A1 | 8/2013 | Denson | |
| 2013/0209968 A1 | 8/2013 | Miller | |
| 2013/0274950 A1 | 10/2013 | Richardson | |
| 2013/0278631 A1 | 10/2013 | Border | |
| 2013/0317711 A1 | 11/2013 | Plante | |
| 2013/0332004 A1* | 12/2013 | Gompert et al. | 701/1 |
| 2013/0345927 A1 | 12/2013 | Cook | |
| 2013/0345929 A1 | 12/2013 | Bowden | |
| 2014/0025225 A1 | 1/2014 | Armitage | |
| 2014/0025254 A1 | 1/2014 | Plante | |
| 2014/0032062 A1 | 1/2014 | Baer | |
| 2014/0047371 A1 | 2/2014 | Palmer | |
| 2014/0058583 A1 | 2/2014 | Kesavan | |
| 2014/0089504 A1 | 3/2014 | Scholz | |
| 2014/0094992 A1 | 4/2014 | Lambert | |
| 2014/0098228 A1 | 4/2014 | Plante | |
| 2014/0152828 A1 | 6/2014 | Plante | |
| 2014/0226010 A1* | 8/2014 | Molin | G06Q 10/06 |
| | | | 348/148 |
| 2014/0232863 A1 | 8/2014 | Paliga | |
| 2014/0279707 A1 | 9/2014 | Joshua | |
| 2014/0280204 A1 | 9/2014 | Avery | |
| 2014/0300739 A1 | 10/2014 | Mimar | |
| 2014/0309849 A1 | 10/2014 | Ricci | |
| 2014/0335902 A1 | 11/2014 | Guba | |
| 2014/0336916 A1 | 11/2014 | Yun | |
| 2015/0035665 A1 | 2/2015 | Plante | |
| 2015/0057836 A1 | 2/2015 | Plante | |
| 2015/0105934 A1 | 4/2015 | Palmer | |
| 2015/0112542 A1 | 4/2015 | Fuglewicz | |
| 2015/0112545 A1 | 4/2015 | Binion | |
| 2015/0134226 A1 | 5/2015 | Palmer | |
| 2015/0135240 A1 | 5/2015 | Shibuya | |
| 2015/0156174 A1 | 6/2015 | Fahey | |
| 2015/0189042 A1 | 7/2015 | Sun | |
| 2015/0222449 A1 | 8/2015 | Salinger | |

(56) References Cited

U.S. PATENT DOCUMENTS

| | | | |
|---|---|---|---|
| 2015/0317846 | A1 | 11/2015 | Plante |
| 2016/0054733 | A1 | 2/2016 | Hollida |

FOREIGN PATENT DOCUMENTS

| | | | |
|---|---|---|---|
| CA | 2692415 | | 8/2011 |
| CA | 2692415 | A1 | 8/2011 |
| DE | 4416991 | A1 | 11/1995 |
| DE | 20311262 | | 9/2003 |
| DE | 202005008238 | | 9/2005 |
| DE | 102004004669 | | 12/2005 |
| DE | 102004004669 | A1 | 12/2005 |
| EP | 0708427 | A2 | 4/1996 |
| EP | 0840270 | A2 | 5/1998 |
| EP | 0848270 | A2 | 5/1998 |
| EP | 1170697 | A2 | 1/2002 |
| EP | 1324274 | A2 | 7/2003 |
| EP | 1355278 | A1 | 10/2003 |
| EP | 1427165 | A2 | 6/2004 |
| EP | 1818873 | A1 | 8/2007 |
| EP | 2104075 | | 9/2009 |
| EP | 2320387 | | 5/2011 |
| EP | 2407943 | | 1/2012 |
| GB | 2268608 | A | 1/1994 |
| GB | 2402530 | | 12/2004 |
| GB | 2402530 | A | 12/2004 |
| GB | 2451485 | | 2/2009 |
| GB | 2447184 | B | 6/2011 |
| GB | 2446994 | | 8/2011 |
| JP | 58085110 | | 5/1983 |
| JP | S5885110 | A | 5/1983 |
| JP | 62091092 | | 4/1987 |
| JP | S6291092 | A | 4/1987 |
| JP | S62166135 | A | 7/1987 |
| JP | 02056197 | | 2/1990 |
| JP | H0256197 | A | 2/1990 |
| JP | H04257189 | A | 9/1992 |
| JP | H05137144 | A | 6/1993 |
| JP | 5294188 | | 11/1993 |
| JP | H08124069 | A | 5/1996 |
| JP | H09163357 | A | 6/1997 |
| JP | H09272399 | A | 10/1997 |
| JP | 10076880 | | 3/1998 |
| JP | H1076880 | A | 3/1998 |
| JP | 2002191017 | | 7/2002 |
| JP | 2002191017 | A | 7/2002 |
| KR | 1000588169 | | 12/2000 |
| WO | 8809023 | A1 | 11/1988 |
| WO | 9005076 | | 5/1990 |
| WO | 9427844 | | 12/1994 |
| WO | 9600957 | A1 | 1/1996 |
| WO | 9701246 | | 1/1997 |
| WO | 9726750 | A1 | 7/1997 |
| WO | 9937503 | | 7/1999 |
| WO | 9940545 | A1 | 8/1999 |
| WO | 9962741 | | 12/1999 |
| WO | 0007150 | A1 | 2/2000 |
| WO | 0028410 | A1 | 5/2000 |
| WO | 0048033 | | 8/2000 |
| WO | 0077620 | | 12/2000 |
| WO | 0123214 | | 4/2001 |
| WO | 0125054 | | 4/2001 |
| WO | 0146710 | A2 | 6/2001 |
| WO | 03045514 | | 6/2003 |
| WO | 2006022824 | | 3/2006 |
| WO | 2006022824 | A2 | 3/2006 |
| WO | 2007067767 | | 6/2007 |
| WO | 2009081234 | | 7/2009 |
| WO | 2011055743 | A1 | 5/2011 |
| WO | 2013072939 | | 5/2013 |
| WO | 2013159853 | | 10/2013 |

OTHER PUBLICATIONS

Trivinci Systems, LLC, Race-Keeper Systems User Guide, Jan. 2011, v1.1.02.*
Schooley, Benjamin, et al. "CrashHelp: A GIS tool for managing emergency medical responses to motor vehicle crashes." Proc. ISCRAM (2010).*
Hindsight 20/20 Software Version 4.0 User's Manual.
Adaptec published and sold its VideoOh! DVD software USB 2.0 Edition in at least Jan. 24, 2003.
Ambulance Companies Use Video Technology to Improve Driving Behavior, Ambulance Industry Journal, Spring 2003.
Amended Complaint for Patent Infringement, Trade Secret Misappropriation, Unfair Competition and Conversion in *DriveCam, Inc. v. SmartDrive Systems, Inc.*, Case No. 3:11-CV-00997-H-RBB, for the Southern District of California, Document 34, filed Oct. 20, 2011, pp. 1-15.
Amendment filed Dec. 23, 2009 during prosecution of U.S. Appl. No. 11/566,424.
Answer to Amended Complaint; Counterclaims; and Demand for Jury Trial in *DriveCam, Inc. v. SmartDrive Systems, Inc.*, Case No. 3:11-CV-00997 H (RBB), for the Southern District of California, Document 47, filed Dec. 13, 2011, pp. 1-15.
U.S. Appl. No. 11/296,906, filed Dec. 8, 2005, File History.
U.S. Appl. No. 11/297,669, filed Dec. 8, 2005, File History.
U.S. Appl. No. 11/297,889, filed Dec. 8, 2005, File History.
U.S. Appl. No. 11/298,069, filed Dec. 9, 2005, File History.
U.S. Appl. No. 11/299,028, filed Dec. 9, 2005, File History.
U.S. Appl. No. 11/593,659, filed Nov. 7, 2006, File History.
U.S. Appl. No. 11/593,682, filed Nov. 7, 2006, File History.
U.S. Appl. No. 11/593,882, filed Nov. 7, 2006, File History.
U.S. Appl. No. 11/595,015, filed Nov. 9, 2006, File History.
U.S. Appl. No. 11/637,754, filed Dec. 13, 2006, File History.
U.S. Appl. No. 11/637,755, filed Dec. 13, 2006, File History.
Bill, 'DriveCam—FAQ', Dec. 12, 2003.
Bill Siuru, 'DriveCam Could Save You Big Bucks', Land Line Magazine, May-Jun. 2000.
Chris Woodyard, 'Shuttles save with DriveCam', Dec. 9, 2003.
Dan Carr, Flash Video Template: Video Presentation with Navigation, Jan. 16, 2006, http://www.adobe.com/devnet/fiash/articles/vidtemplate_mediapreso_flash8.html.
David Cullen, 'Getting a real eyeful', Fleet Owner Magazine, Feb. 2002.
David Maher, 'DriveCam Brochure Folder', Jun. 6, 2005.
David Maher, "DriveCam Brochure Folder", Jun. 8, 2005.
David Vogeleer et al., Macromedia Flash Professional 8UNLEASHED (Sams Oct. 12, 2005).
Del Lisk, 'DriveCam Training Handout Ver4', Feb. 3, 2005.
DriveCam, Inc.'s Infringement Contentions Exhibit A, U.S. Pat. No. 6,389,340, Document 34.1, Oct. 20, 2011.
DriveCam, Inc.'s Infringement Contentions Exhibit B, U.S. Pat. No. 7,659,827. Aug. 19, 2011.
DriveCam, Inc.'s Infringement Contentions Exhibit B, U.S. Pat. No. 7,804,426, Document 34.2, Oct. 20, 2011.
DriveCam, Inc.'s Infringement Contentions Exhibit C, U.S. Pat. No. 7,659,827, Document 34.3, Oct. 20, 2011.
DriveCam, Inc.'s Infringement Contentions Exhibit C, U.S. Pat. No. 7,804,426. Aug. 19, 2011.
DriveCam, Inc.'s Infringement Contentions Exhibit D, Document 34.4, Oct. 20, 2011.
DriveCam—Illuminator Data Sheet, Oct. 2, 2004.
Drivecam.com as retrieved by the Internet Wayback Machine as of Mar. 5, 2005.
DriveCam's Disclosure of Asserted Claims and Preliminary Infringement Contentions in *DriveCam, Inc. v. SmartDrive Systems, Inc.*, Case No. 3:11-CV-00997-H-RBB, for the Southern District of California. Aug. 19, 2011.
DriveCam Driving Feedback System, Mar. 15, 2004.
DriveCam Extrinsic Evidence with Patent LR 4.1 .a Disclosures, Nov. 3, 2011.
DriveCam Extrinsic Evidence with Patent LR 4.1 .a Disclosures, Nov. 8, 2011.
Driver Feedback System, Jun. 12, 2001.

(56) References Cited

OTHER PUBLICATIONS

First Amended Answer to Amended Complaint and First Amended Counterclaims; and Demand for Jury Trial in *DriveCam, Inc.* v. *SmartDrive Systems, Inc.*, Case No. 3:11-CV-00997 H (RBB), for the Southern District of California, Document 53, filed Dec. 20, 2011, pp. 1-48.

First Amended Answer to Amended Complaint and First Amended Counterclaims; and Demand for Jury Trial in *DriveCam, Inc.* v. *SmartDrive Systems, Inc.*, Case No. 3:11-CV-00997 H (RBB), for the Southern District of California, Document 55, filed Jan. 1, 2012, pp. 86-103.

First Amended Answer to Amended Complaint and First Amended Counterclaims; and Demand for Jury Trial in *DriveCam, Inc.* v. *SmartDrive Systems, Inc.*, Case No. 3:11-CV-00997 H (RBB), for the Southern District of California, Document 55, filed Jan. 3, 2012, pp. 86-103.

First Amended Answer to Amended Complaint and First Amended Counterclaims; and Demand for Jury Trial in *DriveCam, Inc.* v. *SmartDrive Systems, Inc.*, Case No. 3:11-CV-00997 H (RBB), for the Southern District of California, Exhibit A, Document 55, filed Jan. 3, 2012, pp. 49-103.

Franke, U., et al., Autonomous Driving Goes Downtown, IEEE Intelligent Systems, 13(6):40-48 (1988); Digital Object Identifier 10.1109/5254.736001.

Gallagher, B., et al., Wireless Communications for Vehicle Safety: Radio Link Performance and Wireless Connectivity Methods, Vehicular Technology Magazine, IEEE, 1(4):4-24 (2006); Digital Object Identifier 10.1109/MVT.2006.343641.

Gandhi, T., et al., Pedestrian Protection Systems: Issues, Survey, and Challenges, IEEE Transactions on Intelligent Transportation Systems, 8(3):413-430 (2007); Digital Object Identifier 10.1109/TITS.2007.903444.

Gary and Sophia Rayner, Final Report for Innovations Deserving Exploratory Analysis (IDEA) Intelligent Transportation Systems (ITS) Programs' Project 84, I-Witness Black Box Recorder, San Diego, CA. Nov. 2001.

GE published its VCR User's Guide for Model VG4255 in 1995.

Glenn Oster, 'Hindsight 20/20 v4.0 Software Installation', 1 of 2, Jun. 20, 2003.

Glenn Oster, 'HindSight 20/20 v4.0 Software Installation', 2 of 2, Jun. 20, 2003.

Glenn Oster, 'Illuminator Installation', Oct. 3, 2004.

Hans Fantel, Video; Search Methods Make a Difference in Picking VCR's, NY Times, Aug. 13, 1989.

'I/O Port Racing Supplies' website discloses using Traqmate's Data Acquisition with Video Overlay system in conjunction with professional driver coaching sessions (available at http://www.ioportracing.com/Merchant2/merchant.mvc?Screen=CTGY&Categorys-ub.--Code=coaching)., printed from site on Jan. 11, 2012.

Inovate Motorsports, OT-1 16 Channel OBD-II Interface User Manual, Version 1.0, Nov. 28, 2007, pp. 3, 4, 21 & 27.

'Interior Camera Data Sheet', Oct. 26, 2001.

International Search Report and Written Opinion issued in PCT/US07/68325 on Feb. 27, 2008.

International Search Report and Written Opinion issued in PCT/US07/68328 on Oct. 15, 2007.

International Search Report and Written Opinion issued in PCT/US07/68329 on Mar. 3, 2008.

International Search Report and Written Opinion issued in PCT/US07/68332 on Mar. 3, 2008.

International Search Report and Written Opinion issued in PCT/US07/68334 on Mar. 5, 2008.

International Search Report for PCT/US2006/47055, Mailed Mar. 20, 2008 (2 pages).

International Search Report issued in PCT/US2006/47042 mailed Feb. 25, 2008.

J. Gallagher, 'Lancer Recommends Tech Tool', Insurance and Technology Magazine, Feb. 2002.

Jean (DriveCam vendor), 'DC Data Sheet', Nov. 6, 2002.

Jean (DriveCam vendor), 'DriveCam brochure', Nov. 6, 2002.

Jean (DriveCam vendor), 'Feedback Data Sheet', Nov. 6, 2002.

Jean (DriveCam vendor), 'Hindsight 20-20 Data Sheet', Nov. 4, 2002.

Jessyca Wallace, 'Analyzing and Processing DriveCam Recorded Events', Oct. 6, 2003.

Jessyca Wallace, 'Overview of the DriveCam Program', Dec. 15, 2005.

Jessyca Wallace, 'The DriveCam Driver Feedback System', Apr. 6, 2004.

Joint Claim Construction Chart, U.S. Pat. No. 6,389,340, 'Vehicle Data Recorder' for Case No. 3:11-CV-00997-H-RBB, Document 43-1, filed Dec. 1, 2011, pp. 1-33.

Joint Claim Construction Chart in *DriveCam, Inc.* v. *SmartDrive Systems, Inc.*, Case No. 11-CV-0997-H (RBB), for the Southern District of California, Document 43, filed Dec. 1, 2011, pp. 1-2.

Joint Claim Construction Worksheet, U.S. Pat. No. 6,389,340, 'Vehicle Data Reporter' for Case No. 3:11-CV-00997-H-RBB, Document 44-1, filed Dec. 1, 2011, pp. 1-10.

Joint Claim Construction Worksheet, U.S. Pat. No. 6,389,340, "Vehicle Data Reporter" for Case No. 3:11-CV-00997-H-RBB, Document 44-1, filed Dec. 1, 2011, pp. 1-10.

Joint Claim Construction Worksheet in *DriveCam, Inc.* v. *SmartDrive Systems, Inc.*, Case No. 3:11-CV-00997 H (RBB), for the Southern District of California, Document 44, filed Dec. 1, 2011, pp. 1-2.

Joint Motion for Leave to Supplement Disclosure of Asserted Claims and Preliminary Infringement Contentions in *DriveCam, Inc.* v. *SmartDrive Systems, Inc.*, Case No. 3:11-cv-00997-H-RBB, Document 29, filed Oct. 12, 2011, pp. 1-7.

Julie Stevens, 'DriveCam Services', Nov. 15, 2004.

Julie Stevens, 'Program Support Roll-Out & Monitoring', Jul. 13, 2004.

Jung, Sang-Hack, et al., Egomotion Estimation in Monocular Infrared Image Sequence for Night Vision Applications, IEEE Workshop on Applications of Computer Vision (WACV '07), Feb. 2007, pp. 8-8; Digital Object Identifier 10.1109/WACV.2007.20.

JVC Company of America, JVC Video Cassette Recorder HR-IP820U Instructions (1996).

Kamijo, S., et al., A Real-Time Traffic Monitoring System by Stochastic Model Combination, IEEE International Conference on Systems, Man and Cybernetics, 4:3275-3281 (2003).

Kamijo, S., et al., An Incident Detection System Based on Semantic Hierarchy, Proceedings of the 7th International IEEE Intelligent Transportation Systems Conference, Oct. 3-6, 2004, pp. 853-858; Digital Object Identifier 10.1109/ITSC.2004.1399015.

Karen, 'Downloading Options to HindSight 20120', Aug. 6, 2002.

Karen, 'Managers Guide to the DriveCam Driving Feedback System', Jul. 30, 2002.

Kathy Latus (Latus Design), 'Case Study—Cloud 9 Shuttle', Sep. 23, 2005.

Kathy Latus (Latus Design), 'Case Study—Lloyd Pest Control', Jul. 19, 2005.

Kathy Latus (Latus Design), 'Case Study—Time Warner Cable', Sep. 23, 2005.

Ki, Yong-Kul, et al., A Traffic Accident Detection Model using Metadata Registry, Proceedings of the Fourth International Conference on Software Engineering Research, Management and Applications; Aug. 9-11, 2006 p. (s):255-259 Digital Object Identifier 10.1109/SERA.2006.8.

Kitchin, Charles. "Understanding accelerometer scale factor and offset adjustments." Analog Devices (1995).

Lin, Chin-Teng et al., EEG-based drowsiness estimation for safety driving using independent component analysis; IEEE Transactions on Circuits and Systems—I: Regular Papers, 52(12):2726-2738 (2005); Digital Object Identifier 10.1109/TCSI.2005.857555.

Lisa McKenna, 'A Fly on the Windshield?', Pest Control Technology Magazine, Apr. 2003.

Miller, D.P., Evaluation of Vision Systems for Teleoperated Land Vehicles. Control Systems Magazine, IEEE, 8(3):37-41 (1988); Digital Identifier 10.1109/37.475.

Munder, S., et al., Pedestrian Detection and Tracking Using a Mixture of View-Based Shape-Texture Models, IEEE Transactions

(56) References Cited

OTHER PUBLICATIONS on Intelligent Transportation Systems, 9(2):333-343 (2008); Digital Identifier 10.1109/TITS.2008.922943.
Panasonic Corporation, Video Cassette Recorder (VCR) Operating Instructions for Models No. PV-V4020/PV-V4520.
Passenger Transportation Mode Brochure, May 2, 2005.
Patent Abstracts of Japan vol. 007, No. 180 (P-215), Aug. 9, 1983 (Aug. 9, 1983) & JP 58 085110 A (Mitsuhisa Ichikawa), May 21, 1983 (May 21, 1983).
Patent Abstracts of Japan vol. 011, No. 292 (E-543), Sep. 19, 1987 (Sep. 19, 1987) & JP 62 091092 A (OK Eng:KK), Apr. 25, 1987 (Apr. 25, 1987).
Patent Abstracts of Japan vol. 012, No. 001 (M-656), Jan. 6, 1988 (Jan. 6, 1988) & JP 62 166135 A (Fuji Electric Co Ltd), Jul. 22, 1987 (Jul. 22, 1987).
Patent Abstracts of Japan vol. 014, No. 222 (E-0926), May 10, 1990 (May 10, 1990) & JP 02 056197 A (Sanyo Electric Co Ltd), Feb. 26, 1990 (Feb. 26, 1990).
Patent Abstracts of Japan vol. 017, No. 039 (E-1311), Jan. 25, 1993 (Jan. 25, 1993) & JP 04 257189 A (Sony Corp), Sep. 11, 1992 (Sep. 11, 1992).
Patent Abstracts of Japan vol. 017, No. 521 (E-1435), Sep. 20, 1993 (Sep. 20, 1993) & JP 05 137144 A (Kyocera Corp), Jun. 1, 1993 (Jun. 1, 1993).
Patent Abstracts of Japan vol. 1996, No. 09, Sep. 30, 1996 (Sep. 30, 1996) & JP 08 124069 A (Toyota Motor Corp), May 17, 1996 (May 17, 1996).
Patent Abstracts of Japan vol. 1997, No. 10, Oct. 31, 1997 (Oct. 31, 1997) & JP 09 163357 A (Nippon Soken Inc), Jun. 20, 1997 (Jun. 20, 1997).
Patent Abstracts of Japan vol. 1998, No. 02, Jan. 30, 1998 (Jan. 30, 1998) & JP 09 272399 A (Nippon Soken Inc), Oct. 21, 1997 (Oct. 21, 1997).
Patent Abstracts of Japan vol. 1998, No. 8, Jun. 30, 1998 (Jun. 30, 1998) & JP 10 076880 A (Muakami Corp), Mar. 24, 1998 (Mar. 24, 1998).
PCT/US2010/022012, Invitation to Pay Additional Fees with Communication of Partial International Search, Jul. 21, 2010.
Peter G. Thurlow, Letter (including exhibits) Regarding Patent Owner's Response to Initial Office Action in Ex Parte Reexamination, Mar. 27, 2012.
'Preliminary Claim Construction and Identification of Extrinsic Evidence of Defendant/Counterclaimant SmartDriveSystems, Inc.' in *DriveCam, Inc. v. SmartDrive Systems, Inc.*, Case No. 3:11-CV-00997-H (RBB), for the Southern District of California. Nov. 8, 2011.
Quinn Maughan, 'DriveCam Enterprise Services', Jan. 5, 2006.
Quinn Maughan, 'DriveCam Managed Services', Jan. 5, 2006.
Quinn Maughan, 'DriveCam Standard Edition', Jan. 5, 2006.
Quinn Maughan, 'DriveCam Unit Installation', Jul. 21, 2005.
Quinn Maughan, 'Enterprise Services', Apr. 17, 2006.
Quinn Maughan, 'Enterprise Services', Apr. 7, 2006.
Quinn Maughan, 'Hindsight Installation Guide', Sep. 29, 2005.
Quinn Maughan, 'Hindsight Users Guide', Jun. 7, 2005.
Ronnie Rittenberry, 'Eyes on the Road', Jul. 2004.
SmartDrives Systems, Inc's Production, SO14246-S014255, Nov. 16, 2011.
'Supplement to DriveCam's Disclosure of Asserted Claims and Preliminary Infringement Contentions' in *DriveCam, Inc. v. SmartDrive Systems, Inc.*, Case No. 3:11-CV-00997-H-RBB, for the Southern District of California. Oct. 14, 2011.
The DriveCam, Nov. 6, 2002.
The DriveCam, Nov. 8, 2002.
Traqmate GPS Data Acquisition's Traqmate Data Acquisition with Video Overlay system was used to create a video of a driving event on Oct. 2, 2005 (available at http://www.trackvision.net/phpBB2/viewtopic.php?t=51&sid=1184fbbcbe3be5c87ffa0f2ee6e2da76), printed from site on Jan. 11, 2012.

U.S. Appl. No. 12/691,639, entitled 'Driver Risk Assessment System and Method Employing Selectively Automatic Event Scoring', filed Jan. 21, 2010.
U.S. Appl. No. 11/377,167, Final Office Action dated Nov. 8, 2013.
U.S. Appl. No. 11/377,157, filed Mar. 16, 2006 entitled, "Vehicle Event Recorder Systems and Networks Having Parallel Communications Links".
U.S. Appl. No. 11/377,167, filed Mar. 16, 2006 entitled, "Vehicle Event Recorder Systems and Networks Having Integrated Cellular Wireless Communications Systems".
USPTO Final Office Action for U.S. Appl. No. 11/297,669, mailed Nov. 7, 2011, 15 pages.
USPTO Final Office Action for U.S. Appl. No. 13/957,810, mailed Jun. 27, 2014, 24 pages.
USPTO Non-Final Office Action for U.S. Appl. No. 11/296,906, mailed Apr. 2, 2009, 7 pages.
USPTO Non-Final Office Action for U.S. Appl. No. 11/296,906, mailed Nov. 6, 2009, 9 pages.
USPTO Non-Final Office Action for U.S. Appl. No. 11/297,669, mailed Apr. 28, 2011, 11 pages.
USPTO Non-Final Office Action for U.S. Appl. No. 11/299,028, mailed Apr. 24, 2008, 9 pages.
USPTO Non-Final Office Action for U.S. Appl. No. 11/377,164, mailed Nov. 19, 2007, 7 pages.
USPTO Non-Final Office Action for U.S. Appl. No. 11/377,164, mailed Nov. 25, 2011, 9 pages.
USPTO Non-Final Office Action for U.S. Appl. No. 11/377,164, mailed Sep. 11, 2008, 8 pages.
USPTO Non-Final Office Action for U.S. Appl. No. 11/377,167, mailed Jun. 5, 2008, 11 pages.
USPTO Non-Final Office Action for U.S. Appl. No. 11/800,876, mailed Dec. 1, 2010, 12 pages.
USPTO Non-Final Office Action for U.S. Appl. No. 11/800,876, mailed Dec. 20, 2011, 8 pages.
USPTO Non-Final Office Action for U.S. Appl. No. 12/096,591, mailed May 20, 2014, 19 pages.
USPTO Non-Final Office Action for U.S. Appl. No. 14/036,299, mailed Aug. 12, 2014.
USPTO Non-Final Office Action for U.S. Appl. No. 11/296,907, Mailed Mar. 22, 2007 ( 17 pages).
USPTO Non-final Office Action mailed Aug. 27, 2009 during prosecution of U.S. Appl. No. 11/566,424.
USPTO Non-Final Office Action mailed Nov. 27, 2013 in U.S. Appl. No. 13/957,810, filed Aug. 2, 2013.
Veeraraghavan, H., et al., Computer Vision Algorithms for Intersection Monitoring, IEEE Transactions on Intelligent Transportation Systems, 4(2):78-89 (2003); Digital Object Identifier 10.1109/TITS.2003.821212.
Wijesoma, W.S., et al., Road Curb Tracking in an Urban Environment, Proceedings of the Sixth International Conference of Information Fusion, 1:261-268 (2003).
World News Tonight, CBC Television New Program discussing teen drivers using the DriveCam Program and DriveCam Technology, Oct. 10, 2005, on PC formatted CD-R, World News Tonight.wmv, 7.02 MB, Created Jan. 12, 2011.
Written Opinion issued in PCT/US07/68328 on Oct. 15, 2007.
Written Opinion of the International Searching Authority for PCT/US2006/47042. Mailed Feb. 25, 2008 (5 pages).
Written Opinion of the International Searching Authority for PCT/US2006/47055, Mailed Mar. 20, 2008 (5 pages).
"DriveCam, Inc's Disclosure of Proposed Constructions and Extrinsic Evidence Pursuant to Patent L.R. 4.1.A & 4.1.b" Disclosure and Extrinsic Evidence in *DriveCam, Inc. v. SmartDrive Systems, Inc.*, Case No. 3:11-CV-00997-H-RBB, for the Southern District of California. Nov. 8, 2011, 68 pages.
"DriveCam Driving Feedback System", DriveCam brochure, Jun. 12, 2001, Document #6600128, 2 pages.
"DriveCam Driving Feedback System" DriveCam brochure, Mar. 15, 2004, 4 pages.
"DriveCam Passenger Transportation Module", DriveCam brochure, Oct. 26, 2001, 2 pages.
"DriveCam Video Event Data Recorder", DriveCam brochure, Nov. 6, 2002, Document #6600127, 2 pages.

(56) References Cited

OTHER PUBLICATIONS

"Responsive Claim Construction and Identification of Extrinsic Evidence of Defendani/Counterclaimant SmartDrive Systems, Inc." Claim Construction and and Extrinsic Evidence in *DriveCam, Inc. v. SmartDrive Systems, Inc.*, Case No. 3:11-CV-00997-H (RBB), for the Southern District of California. Nov. 15, 2011, 20 pages.
"Sonic MyDVD 4.0: Tutorial: Trimming video segments". Tutorial for software bundled with Adaptec VideoOh! DVD USB 2.0 Edition, 2003, 13 pages.
"User's Manual for DriveCam Video Systems' HindSight 20/20 Software Version 4.0" DriveCam Manual, San Diego, 2003, Document #6600141-1, 54 pages.
Canadian Office Action issued in Application No. 2,632,685 dated Jan. 30, 2015; 5 pages.
Dan Maher, "DriveCam Taking Risk Out of Driving", DriveCam brochure folder, Jun. 6, 2005, 6 pages.
Del Lisk, "DriveCam Training Seminar" Handout, 2004, 16 pages.
European Examination Report issued in EP 07772812.9 on Jan. 22, 2015; 5 pages.
Jean (DriveCam vendor) "DriveCam Driving Feedback System", DriveCam brochure, Nov. 6, 2002, Document #6600128-1, 2 pages.
Notice of Allowance Allowance for U.S. Appl. No. 14/036,299, mailed Mar. 20, 2015, 5 pages.
Notice of Allowance Application for U.S. Appl. No. 11/566,424, mailed Feb. 26, 2010, 6 pages.
Notice of Allowance for U.S. Appl. No. 11/377,164, mailed Dec. 3, 2014, 5 pages.
Notice of Allowance for U.S. Appl. No. 11/377,164, mailed Feb. 13, 2015, 2 pages.
Notice of Allowance for U.S. Appl. No. 11/377,164, mailed Feb. 25, 2014, 2 pages.
Notice of Allowance for U.S. Appl. No. 11/377,164, mailed Nov. 18, 2013, 7 pages.
Notice of Allowance for U.S. Appl. No. 11/377,167, mailed Apr. 1, 2015, 7 pages.
Notice of Allowance for U.S. Appl. No. 11/800,876, mailed Apr. 19, 2012, 8 pages.
Notice of Allowance for U.S. Appl. No. 13/957,810, mailed Jun. 8, 2015, 10 pages.
USPTO Final Office Action for U.S. Appl. No. 11/296,906, mailed Aug. 8, 2012, 15 pages.
USPTO Final Office Action for U.S. Appl. No. 12/096,591, mailed Dec. 5, 2014, 23 pages.
USPTO Final Office Action for U.S. Appl. No. 12/096,591, mailed Jul. 18, 2012, 15 pages.
USPTO Final Office Action for U.S. Appl. No. 12/096,591, mailed Nov. 7, 2013, 14 pages.
USPTO Final Office Action for U.S. Appl. No. 13/957,810, mailed Jun. 27, 2014, 22 pages.
USPTO Final Office Action for U.S. Appl. No. 14/036,299, mailed Feb. 24, 2015, 9 pages.
USPTO Non-Final Office Action for U.S. Appl. No. 11/296,906, mailed Apr. 8, 2014, 19 pages.
USPTO Non-Final Office Action for U.S. Appl. No. 11/296,906, mailed Jun. 12, 2012, 13 pages.
USPTO Non-Final Office Action for U.S. Appl. No. 11/377,164, mailed Apr. 7, 2014, 7 pages.
USPTO Non-Final Office Action for U.S. Appl. No. 11/377,164, mailed Aug. 18, 2014, 5 pages.
USPTO Non-Final Office Action for U.S. Appl. No. 11/377,164, mailed Sep. 10, 2012, 10 pages.
USPTO Non-Final Office Action for U.S. Appl. No. 11/377,167, mailed Jun. 27, 2013, 11 pages.
USPTO Non-Final Office Action for U.S. Appl. No. 12/096,591, mailed Jun. 14, 2011, 8 pages.
USPTO Non-Final Office Action for U.S. Appl. No. 12/096,591, mailed Mar. 27, 2013, 16 pages.
USPTO Non-Final Office Action for U.S. Appl. No. 13/957,810, mailed Apr. 17, 2015, 6 pages.
USPTO Non-final Office Action for U.S. Appl. No. 13/957,810, mailed Nov. 27, 2013, 18 pages.
USPTO Non-Final Office Action mailed Jan. 4, 2016 in U.S. Appl. No. 14/529,134, filed Oct. 30, 2014 (65 pgs).
Trivinci Systems, LLC, "Race-Keeper System User Guide", V1 .1.02, Jan. 2011, p. 21.
PCT International Search Report and Written Opinion for PCT/US15/60721 dated Feb. 26, 2016, 11 pages.
DriveCam, Inc.'s Infringement Contentions Exhibit B, U.S. Pat. No. 7,659,827. Aug. 19, 2011. (29 pgs.).
DriveCam, Inc.'s Infringement Contentions Exhibit C, U.S. Pat. No. 7,804,426. Aug. 19, 2011. (47 pgs.).
DriveCam's Disclosure of Asserted Claims and Preliminary Infringement Contentions in *DriveCam, Inc. v. SmartDrive Systems, Inc.*, Case No. 3:11-CV-00997-H-RBB, for the Southern District of California. Aug. 19, 2011. (6 pgs.).
'Preliminary Claim Construction and Identification of Extrinsic Evidence of Defendant/Counterclaimant SmartDriveSystems, Inc.' in *DriveCam, Inc. v. SmartDrive Systems, Inc.*, Case No. 3:11-CV-00997-H (RBB), for the Southern District of California. Nov. 8, 2011. (13 pgs.).
'Supplement to DriveCam's Disclosure of Asserted Claims and Preliminary Infringement Contentions' in *DriveCam, Inc. v. SmartDrive Systems, Inc.*, Case No. 3:11-CV-00997-H-RBB, for the Southern District of California. Oct. 14, 2011. (7 pgs.).
PCT International Search Report and Written Opinion for PCT/IB16/51863, dated Sep. 16, 2016.

* cited by examiner

VEHICLE EVENT PLAYBACK APPARATUS AND METHODS

BACKGROUND OF THE INVENTION

Field

The following invention disclosure is generally concerned with multi-media playback systems and specifically concerned with playback systems for vehicle event record playback and analysis.

Prior Art

Multi-media players are designed and configured to run on computer systems and play back systems data files of particular nature and configuration. For example, a very popular multi-media player commonly known as 'Windows Media Player®' can play video encoded media files consistent with a format defined in the MP4 standard among others.

Besides common video playback systems, modern computing systems ubiquitously include user interface mechanisms by which a user might drive execution of a playback via interactive control objects.

One example of a user interface which affords a user improved functionality of displayed information is presented in U.S. Pat. No. 8,176,431 by Scannell et al, published May 8, 2012. In this presentation, the inventors configure their controls in a 'web browser add-on' system in which a menu of selectable options are displayed whereby these options are determined by 'user-centric' information including web-surfing characteristics, device information, network-authentication information.

Yano et al of U.S. Pat. No. 8,159,506 show how graphical user interfaces with interactive control objects might be used to effect image displaying methods. In a display field of one control object, image information is presented to a user. Depending upon certain actions taken by an operator/user, the manner in which images are displayed is changed. The image display control is responsive to the other controls of the graphical user interface.

One very important invention includes a concept relating to time synchronized presentation of information at a plurality of controls. Presented in U.S. Pat. No. 8,126,309, which recently published on Feb. 28, 2012, the invention relates to video playback. In particular, inventor Sakai instructs that video playback be effected in conjunction with supporting related data including associations with a timestamp. As a video stream is advanced in time, related data is presented synchronously therewith. By careful management of timestamps, the video playback assures data presented in the interface relates particularly and precisely to a frame-by-frame notion of the image series.

While systems and inventions of the art are designed to achieve particular goals and objectives, some being no less than remarkable, known systems have nevertheless include limitations which prevent their use in new ways now possible. Inventions of the art are not used and cannot be used to realize advantages and objectives of the teachings presented herefollowing.

SUMMARY OF THE INVENTION

Comes now, Jason Palmer and Slaven Sljivar with inventions of a vehicle event record playback systems including devices and methods. It is a primary function of these systems to provide review and analysis means particularly suited and arranged in view of information captured by high performance vehicle event recorders. In contrast to the prior art, systems first presented here do not suffer limitations which prevent their use for display or data captured in high performance vehicle event recorders.

Specialized high-performance vehicle event recorders produce data-rich event record datasets in response to anomalies detected during vehicle operation. Because event record datasets can contain considerable amounts of data in many data formats and arrangements, they tend to be very difficult to parse, read, interpret, and use. Heretofore, some vehicle event recorder data has been manually reviewed and certain data subsets of greatest importance are sometimes manually developed from raw data into visual presentations by way of standard software such as spreadsheet plotting utilities. Known vehicle event recorder playback systems may support some basic video playback functionality, but those systems do not support presentation of many types of data which may be collected in a vehicle event recorder.

Vehicle event data playback systems presented herefollowing include advanced playback of vehicle event recorder data. These vehicle event record playback systems include visual devices are particularly arranged to express vehicle performance data in graphical, image and alphanumeric forms. These systems are arranged to present data in logical arrangements whereby highly diverse datatypes collected at various vehicle subsystems are presented in time synchronized schemes along with a plurality of complementary data. Data presented in this fashion permits far greater analysis to enable reviewers to devise highly useful coaching feedback.

In one first example, vehicle performance data collected by way of a vehicle's onboard diagnostic system (OBD) and engine control unit (ECU) is included and associated with other data collected at the same (or nearly same) instant in time. An event record is prepared in a manner where all data measurements are associated with a timestamp or other time synchronization scheme. In this way, synchronized playback of data from a plurality of data sources is enabled.

On playback, a human reviewer is presented with simultaneous views and expressions of many data elements, each presented in a visual nature on a common display field of a unique graphical user interface. Since these data elements often have a high level of interdependence, simultaneous expression of their instantaneous values in a time sequenced series playback enables a most advanced system for vehicle event record review.

Graphical user interfaces of these systems include control objects which are responsive to data values of vehicle event recorder event record datasets and may be expressed visually. Combinations of various related control objects operate together in synchronization to characterize and describe particular actions and states associated with a vehicle and its many subsystems during a recorded exception event.

Particularly, these control objects are arranged to visually express data collected from vehicle subsystems in both graphical and alphanumeric forms. In some cases, data associated with standard OBD and ECU systems and to present that data in a visual form in conjunction with simultaneous playback of related video.

According to the specifications here, control objects of a graphical user interface are coupled to a single event timeline whereby presentation of data at each of these control objects strictly conforms to the event timing.

In most important versions of these systems, 'video playback' is a first core feature accordingly, sophisticated video players are generally included as a primary element of these graphical user interfaces. Video player systems of these devices may include those suitable for playback of common video captured at a vehicle event recorder video camper and in addition thereto, these video players are also suitable for playback of virtual video where 'virtual video' includes image series playback where the images are from sources other than a vehicle event recorder. These may include forward and aft video camera views, street view image series, mapview image series, and even birdseye view playback.

Another important control object found in the these playback apparatus include graphical representations of acceleration data in one or more coupled controls. One very unique and important feature relates to a notation facility which is further coupled to an event timeline. The notation facility permits replay of manually prepared notes to which a time Association has been made and assigned in synchronization with event replay.

OBJECTIVES OF THE INVENTION

It is a primary object of the invention to provide vehicle event record playback systems.

It is an object of the invention to synchronously playback a plurality of datastreams via a unitary interface system.

It is an object of the invention to provide vehicle event record playback systems with multiview video playback.

It is a further object to provide graphical controls which are bound to data collected via automotive OBD and ECU systems.

It is an object of the invention systems to include a notation field which includes elements associated with time instants of vehicle event record datasets.

A better understanding can be had with reference to detailed description of preferred embodiments and with reference to appended drawings. Embodiments presented are particular ways to realize the invention and are not inclusive of all ways possible. Therefore, there may exist embodiments that do not deviate from the spirit and scope of this disclosure as set forth by appended claims, but do not appear here as specific examples. It will be appreciated that a great plurality of alternative versions are possible.

BRIEF DESCRIPTION OF THE DRAWING FIGURES

These and other features, aspects, and advantages of the present invention will become better understood with regard to the following description, appended claims and drawings where:

FIG. 1 is a line drawing view of one graphical user interface which illustrates a version of these systems;

FIG. 2 presents one version of a timeline control time synchronized with images presented in related image control objects;

Figure 8:
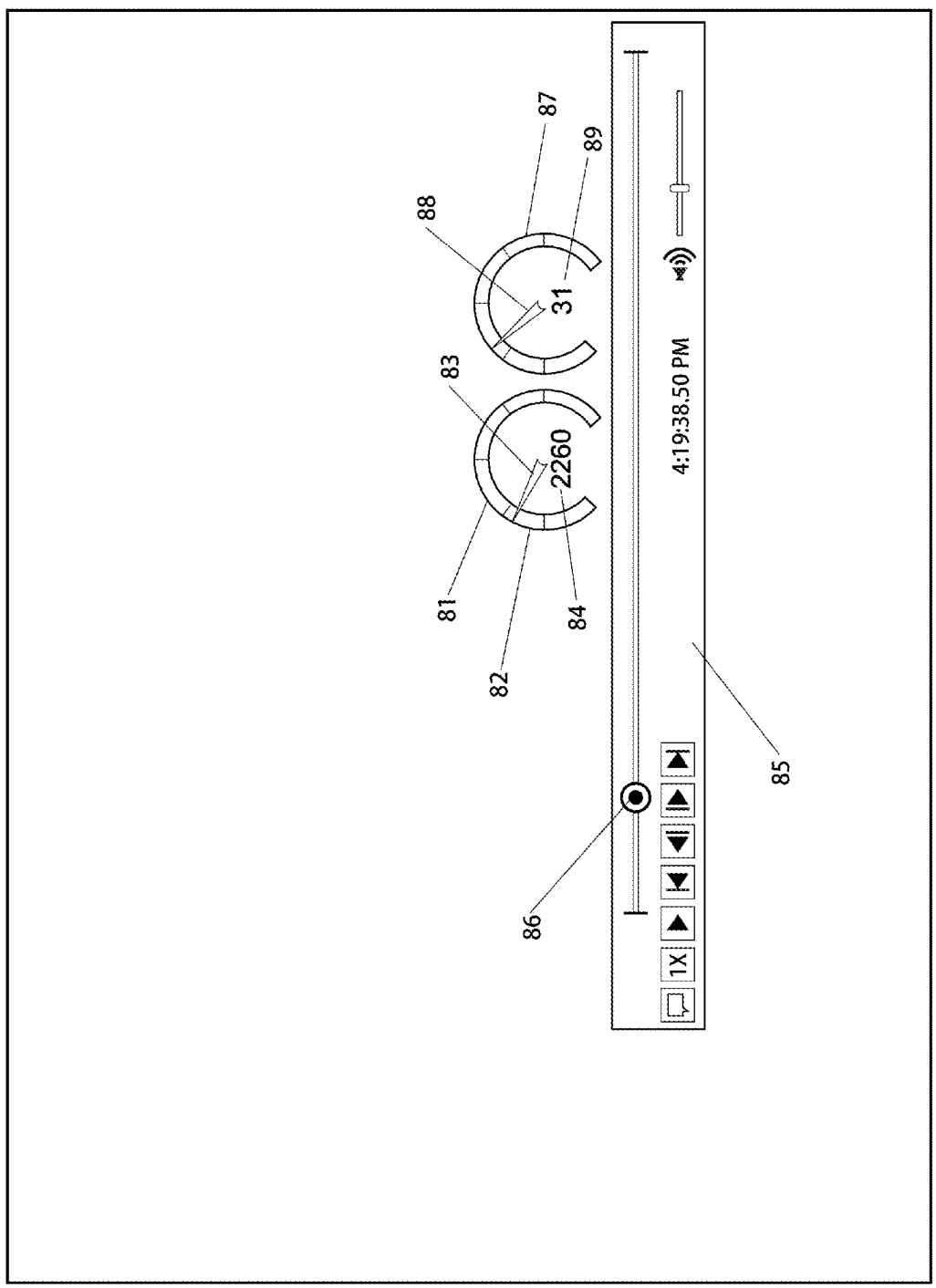
Figure 9:
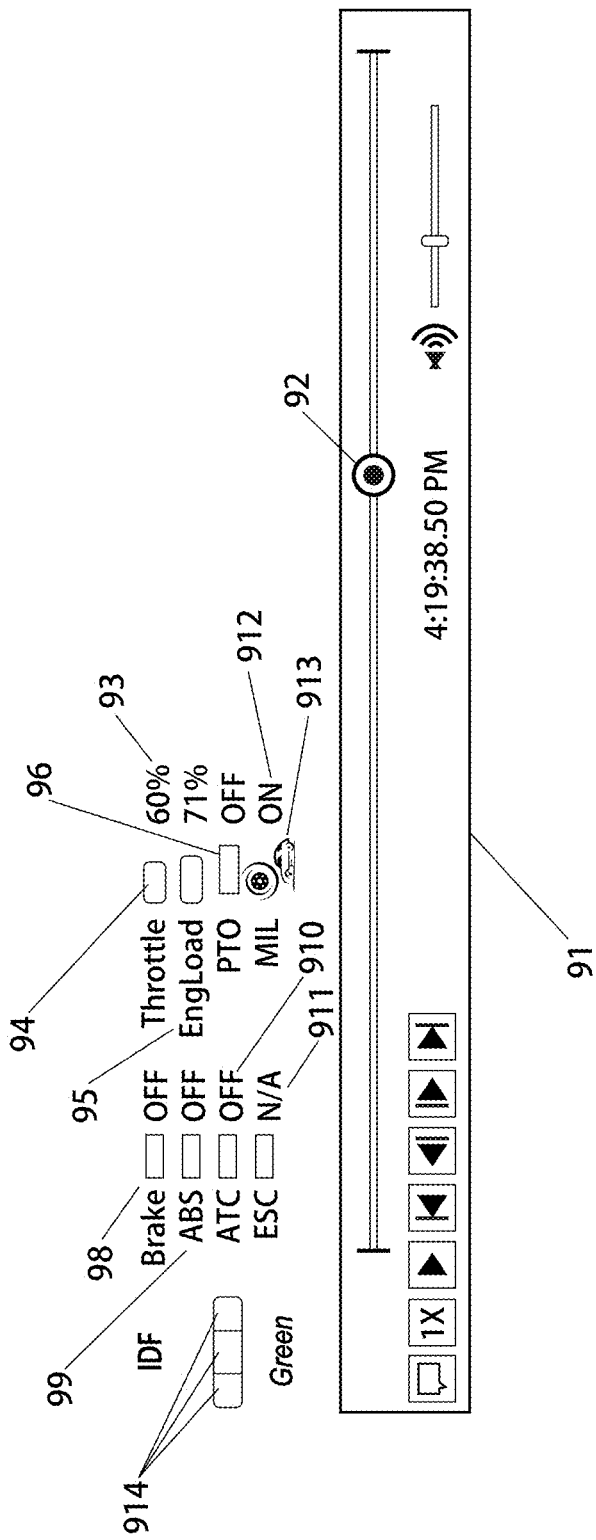
Figure 10:
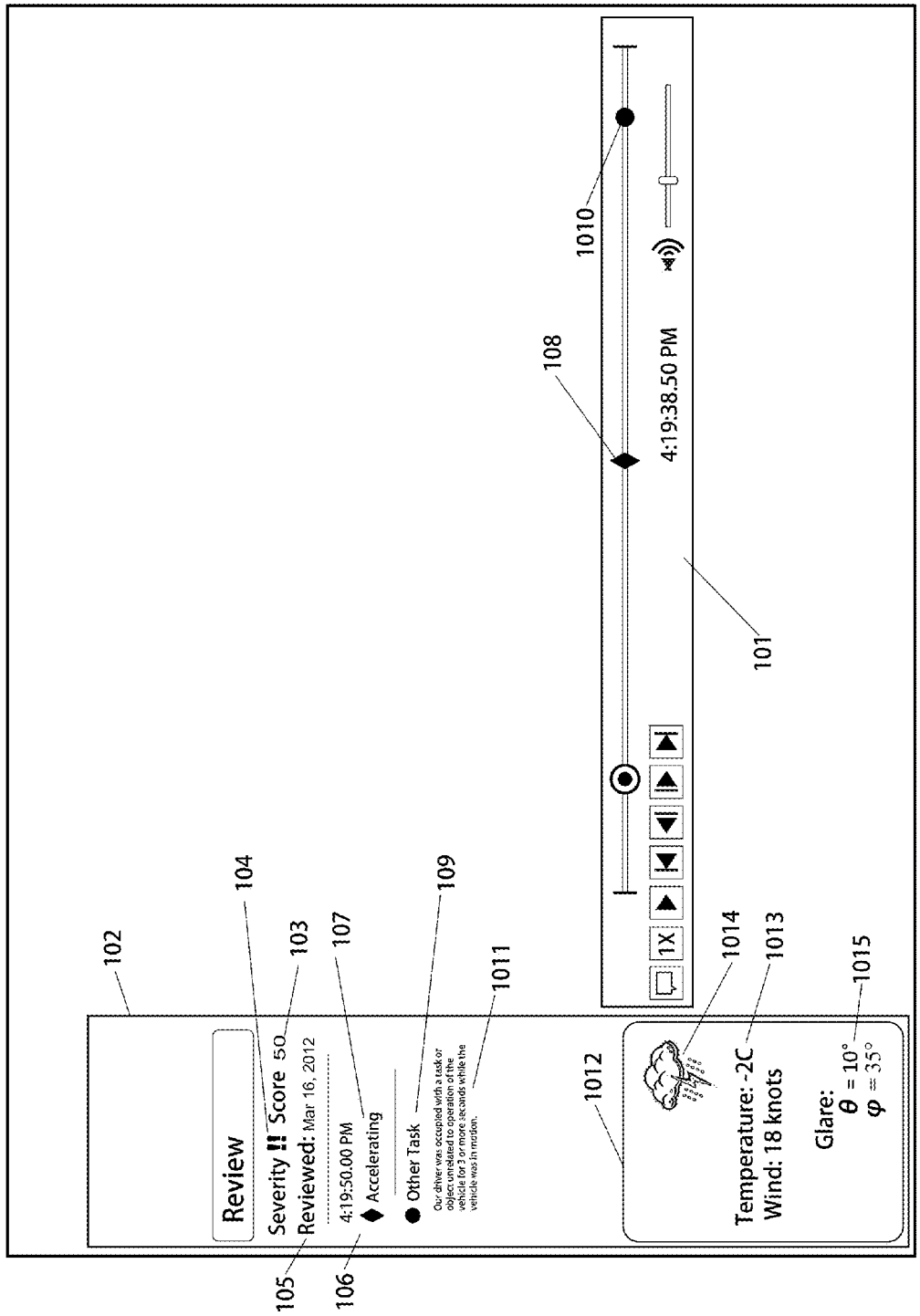
Figure 11:
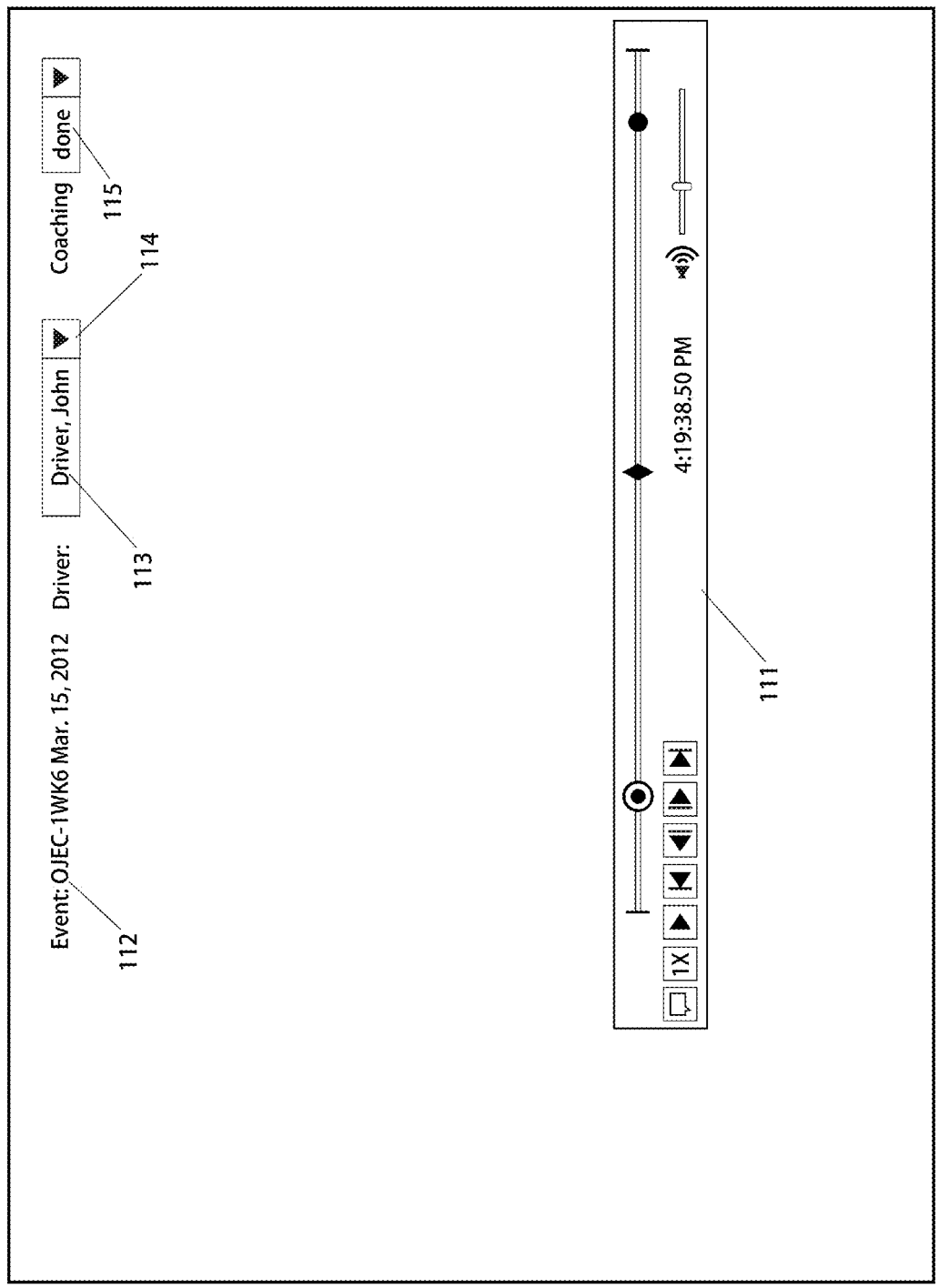

FIG. 8 includes illustrations of a version of vehicle speed and engine speed control objects synchronized and commonly coupled to a timeline control;

FIG. 9 is a drawing of a plurality of control objects which are bound to standard vehicle sensors via on-board diagnostics and/or engine control unit systems of a subject vehicle;

FIG. 10 presents a special time responsive notation field type control object and its contents which are bound and responsive to an event timeline; and FIG. 11 indicates additional auxillary elements which may be included in some of these graphical user interface versions.

GLOSSARY OF SPECIAL TERMS

Throughout this disclosure, reference is made to some terms which may or may not be exactly defined in popular dictionaries as they are defined here. To provide a more precise disclosure, the following term definitions are presented with a view to clarity so that the true breadth and scope may be more readily appreciated. Although every attempt is made to be precise and thorough, it is a necessary condition that not all meanings associated with each term can be completely set forth. Accordingly, each term is intended to also include its common meaning which may be derived from general usage within the pertinent arts or by dictionary meaning. Where the presented definition is in conflict with a dictionary or arts definition, one must consider context of use and provide liberal discretion to arrive at an intended meaning. One will be well advised to error on the side of attaching broader meanings to terms used in order to fully appreciate the entire depth of the teaching and to understand all intended variations.

Control Object

A 'control object' is a device which may be coupled to data or a data stream and is responsive thereto. Control objects include: parametric input couplings and data interfaces, underlying logic code which defines performance, a visual expression, [an event set, triggers, instantaneous state, other].

Event Timeline

An event timeline has a start-time and an end-time and continuous period therebetween. An event record dataset includes an event timeline definition for events recorded at a vehicle event recorder.

'Virtual Video'

A virtual video is comprised of a series of images, said images being formed by something other than the video camera of a vehicle event recorder, for example a series of map images played in sequence over some prescribed timeline.

Event Record Dataset

An event record dataset is comprised of data capture during an event timeline from a plurality of sensors and measurement systems including coupled data and information systems such as the Internet. Further, an event record dataset includes data captured locally at a vehicle event recorder including video images.

PREFERRED EMBODIMENTS OF THE INVENTION

A vehicle event data playback apparatus in accordance with these teachings includes graphical user interfaces specifically designed with particular functionality and cooperation with respect to vehicle event recorders and the event dataset information they produce. Such graphical user interfaces may be highly interactive and responsive to user/ operator inputs effected by a computer peripheral devices. For example, a 'point-and-click' action of a computer mouse, among others.

These systems (apparatus and methods) include particular couplings to vehicle event recorders and data captured in vehicle event recorders. These systems including a logic processor, display device and graphical user interface, receive as input vehicle event recorder datasets. Prescribed program code may be executed at the logic processor to operate on datasets received from vehicle event recorders. Data from these datasets are passed into control objects as parametric input to drive the various visual states of the control objects.

Control Objects

Graphical user interfaces of vehicle event recorder dataset playback systems presented herein are comprised of a plurality of control objects. These control objects may include visual appearances which may change in response to user interaction and specific data values of a particular subject dataset under review. Some of these control objects as they are interactive and responsive to 'point-and-click' or 'click and drag' user interactions. Control objects of these systems are specifically coupled to and designed to cooperate with data types and data objects unique to vehicle event recorder event record datasets and they are not suitable for use as general purpose controls in contrast to those found in common graphical user interface programming packages.

As a first important feature of control objects of these systems, the control objects are specifically designed with appearance and data ranges which agree with the particular information generated by vehicle event recorders in view of operation of vehicles. The control objects of these graphical user interfaces have a nature and scheme such that they best support visual expression of data which is contained in a vehicle event record event dataset. Many important illustrative examples are included herefollowing.

Control objects of these systems not only include arrangements which support a range of visual expression, they additionally include logic code. Logic code (not visible to a user) operates to receive data input, parse that data, process the data in accordance with prescribed algorithms which are part of the logic code and further to provide outputs which may include adjustments the visual states of the control object.

Timeline Control Object

Vehicle event recorders are specifically designed to capture compound datasets relating to exception event of a finite period. Accordingly, most important aspect of these vehicle event playback systems relates to a timeline control object and its relationship with the event dataset and other controls of the graphical user interface. The preferred timeline control object of these systems includes an associated time range equivalent to the time range of the event period. The time range associated with any particular event may vary in length from a fraction of a second to several tens of minutes or even hours. However many events recorded by vehicle event recorders are a few seconds or a few tens of seconds. Timeline control objects in accordance with these teachings will have a 'start time', and an 'end time' and a continuous time period therebetween. The 'continuous' time period between the start time and the end time may further include a finite number of frame instants, frame stops or keyframes. These are discrete moments in the event period or timeline in which an image frame capture has occurred. A timeline control object of these graphical user interfaces is synchronized with the time period over which events and data are recorded at a vehicle event recorder. The timeline control object also includes a 'start time' and an 'end time' and these are set in accordance with specific related values of the corresponding event record dataset. In the example illustrated as FIG. 1, an event record includes a start time of 4:19:35 and an end time of 4:20:02 for a total event period of 27 seconds.

For improved ease of operation of these timeline controls when playing back vehicle event record data, it is useful to arrange the control to extend an appreciable length of interface regardless of the event period extent.

That is, a timeline control which supports a twentyseven second event is preferably the same size as a timeline control which supports a 10 minute event. Thus a timeline control is 'normalized' to the event period without change of its physical size. In view of the particular data contained in an event record dataset, the start time and end time are associated with the timeline control extremities, and 100% of the timeline control length is divided evenly and occupied by the entire event without dependence upon the actual extent of the event period. Accordingly, the timeline control object cooperates particularly with playback of vehicle event recorder output in that the timeline auto-adjusts to normalize for events of any period length. A timeline control object is adapted to match the extent of time period of a specific event under replay and thereafter is further set to agree with particulars of a specific event record. Namely, timeline pip markers 23 which indicate important features of the event record may be distributed about the timeline to provide access to detailed information relating to those important features. Timeline pip markers may be preencoded elements made responsive to mouse clicks. These pip markers may be associated with an instant in time or any time period which is a subset of the entire event period. Further, other control objects of the graphical user interface may be coupled to these pip marker objects and be further responsive thereto, and also be responsive to mouse clicks associated with the pip markers.

Timeline Replay Instant Indicator Control

Another important element of the timeline object is the timeline replay instant indicator control object. The instantaneous state of a timeline replay instant indicator specifies a replay instant in time, the replay instant to which other controls are bound and responsive. A timeline replay instant indicator marks the present instant of the playback system at any time. The present instant represents any moment in the event period between the event start time and the event end time. For every control which is bound to the timeline control object, the present instant time may be used to set the visual state of the control. The visual state of any control object may be different from each instant of the event period. When the timeline replay instant indicator is associated with another time instant of the event period, either manually or during a preplay execution, each control bound to the timeline control automatically updates its visual state to represent data captured at that moment of the event period. Timeline replay instant indicators are responsive to click-and-drag actions and are further responsive to automated replay controls such as 'play' control, 'fast forward' control, 'rewind' control, et cetera.

Replay Controls

Replay controls of these systems operate in a conventional way. Those experts in video replay systems will already be familiar with a 'play' control button, 'fast forward', rewind, 'loop', among others. Timeline control objects of these vehicle event playback systems also include such controls which operate analogously with conventional systems.

Video Players

Preferred modes of vehicle event playback systems presented here include side-by-side playback of a plurality of videos (time series presentation of images). In each of two video control objects, a prescribed video may be played back synchronously. This is particularly useful in gaining a most complete understanding of a complex scene which may have more than one important point of view—such as a driving incident. For example, in a driving incident it may be important to consider the precise timing of event in the view of the driver and further in a view of traffic ahead. When these two views are considered together, an expert reviewer may draw more precise conclusions with regard to the event details.

Accordingly, the event playback systems are particularly characterized by side-by-side video playback controls for playing back videos of two or more unique viewpoints.

Advanced vehicle event recorder systems often include a plurality of video capture stations (cameras) each having an important and unique viewpoint. In some useful versions of vehicle event recorders, a 'forward-looking' camera is arranged to capture a traffic view ahead of the vehicle and a second reward looking camera is arranged to capture a view of a passenger/driver space.

There is an important time relationship between these two video views because actions taken by a vehicle operator relates in many ways to the traffic and conditions ahead, it is sometimes important to provide a simultaneous playback which is carefully synchronized in time. In this way, one can understand a driver's response to things which may be discovered observable in the forward view. Therefore, preferred versions of these vehicle event data playback systems include a plurality of video players where each of them is synchronized in time to the others and the timeline control object, and with particular respect to the timeline replay instant indicator. Where vehicle event recorders support more than two video recorders, a single timeline control may be used to synchronize those in a similar manner.

An operator/reviewer of these vehicle event data playback systems may 'scroll' through discrete video frames of the event timeline by adjusting the playback instant indicator, for example via 'click-and-drag' type actions. Accordingly, the graphical user interface devices of this invention includes video playback controls coupled to the playback instant element of any timeline control object. In this way, two separate views about the vehicle environment may be considered simultaneously in a side-by-side arrangement where both views represent substantially the same instant in time as synchronized by the timeline control.

'Virtual' Videos

While most preferred versions of these systems include side-by-side playback of forward and after views taken from video cameras in a vehicle event recorder, (i.e. 'real' video), alternative versions may include at least one video playback display in which a 'virtual video' is presented. A virtual video may include a time series of images whereby the images are captured in a system which is not a vehicle event recorder. However, these virtual videos nevertheless do relate directly to the events captured. For example, one type of virtual video in accordance with this teaching may present images having dependence upon the event timeline. Another example may have dependence upon the vehicle position as a function of time. Still another may have a position dependence with prescribed offset. More details of each of these types of virtual videos follow.

Streetview Player

In one special preferred version of these vehicle event data playback systems, an image series player 31 (video player) is arranged to play a special image series which were not recorded by the vehicle event recorder. Rather, a plurality of still images are recalled from a prepared database to form an image set which may be played in series. Those images when played together as a 'video' in the video player constitute a 'virtual video' for purposes of this teaching. However, this replay may be well coordinated and having direct dependence with respect to the event record. For example, this virtual special video timeline may be synchronized with the event timeline 32. More importantly, the actual location of a vehicle as recorded by the vehicle event recorder is coupled to the viewpoint from which the recalled images are made.

When the timeline control is set into a 'play' mode, the video of actual captured images may appear in a video player control adjacent to a second player which plays the virtual streetview video. This virtual video includes images from the same locations and viewpoints with respect to the event period, but these images may include enhancements and augmentations to bring a more complete understanding of the actual event. In one example, streetview images provided by a service like Google's StreetView system can be recalled in view of a plurality of position measurements taken by the vehicle event recorder. For this plurality of locations (vehicle's location as measured by a GPS for example) captured over the period of any particular event, a streetview image from a corresponding location may be recalled from the image database. Each recalled image is then assigned a time instant corresponding to those times from which the playback timeline 21 is comprised to assemble a virtual video of streetview images which directly corresponds to the video actually captured at the vehicle event recorder cameras. One advantage lies partly in the clarity of the recalled images which may have been provided on a nice sunny day in comparison to images captured by the vehicle event recorder which might be of inferior clarity due for example to inclement weather including fog or sun glare. Further, nighttime may similarly block a clear view. Still further objects in the scene during the event capture such as a large truck. Further advantages are to be realized in view of the labels which might be incorporated with the prepared streetview images. For example, address label 28 indicates a street address most closely associated with the image viewpoint.

Video Player Tabstrip

Since it is generally inconvenient to view many videos simultaneously, these players typically have two players side-by-side with the precise video type selectable in the interface by way of a tabstrip control 33 an example which includes four tab selections. In agreement with which tab is selected and triggered, the video playback may be switched between the possible video presentation types. However, despite the selected video type, the player presents a synchronized playback of both real and virtual videos in agreement with the event period and the timeline control.

Mapview Player

Figure 4:
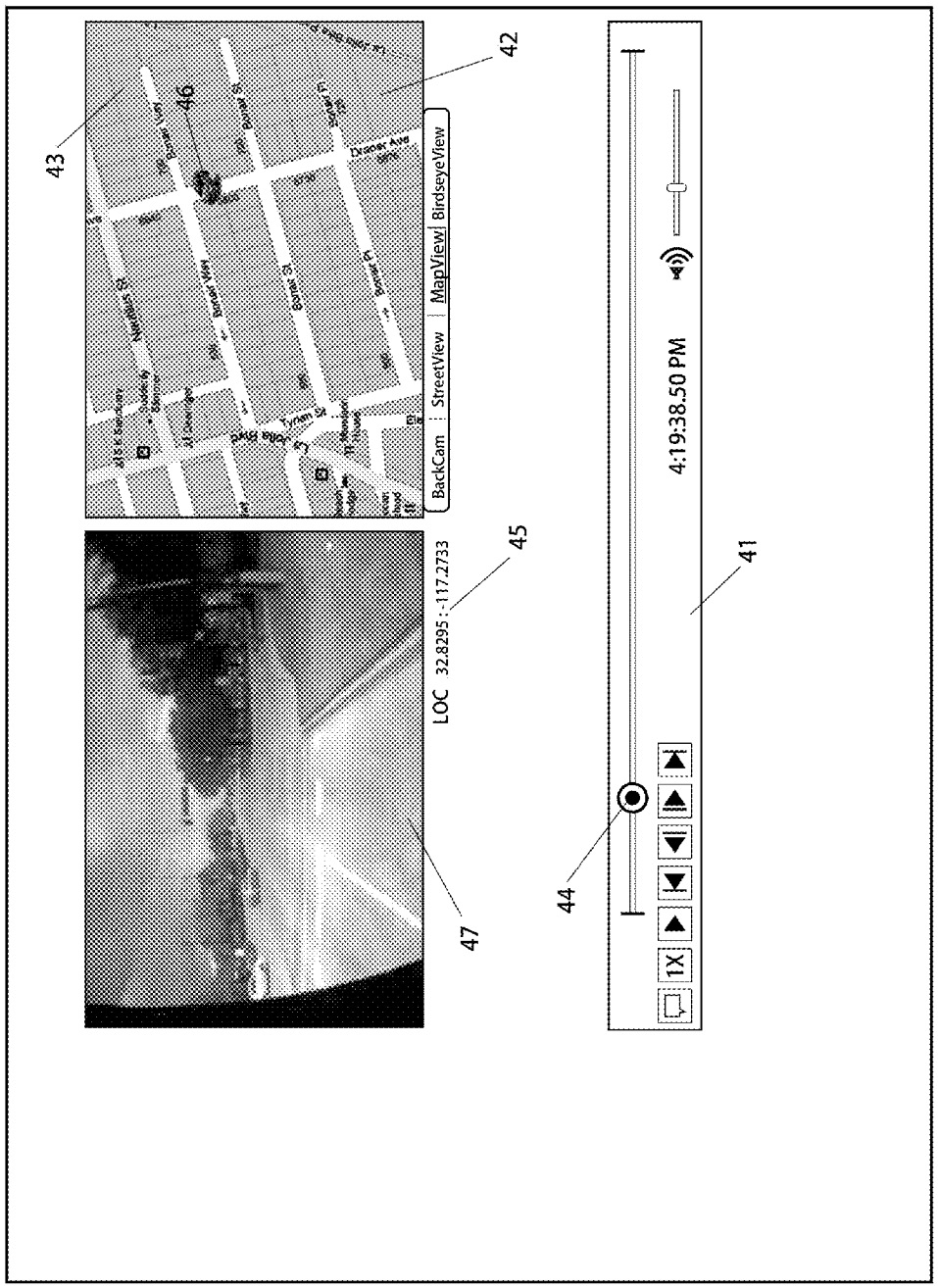
FIGS. 4-6 show additional versions of side-by-side time synchronized video players similarly coupled to related video from sources other than vehicle event recorders.

There is another type of important virtual video supported by these playback systems which relates to moving maps—a mapview virtual video is depicted in FIG. 4. In a fashion similar to that described in the streetview embodiment, a plurality of map images are prepared and saved to form an image series consistent with an event record dataset. In particular, both the vehicle location and the event timeline 41 are considered informing a series of map images suitable for playback in a mapview video player 42.

A separate map image 43 with appropriate scale, size and orientation is presented in the viewer for every discrete instant of the event period as represented in the event timeline. When playback instant control 44 is moved to another time (constant) of the event timeline, the vehicle also moves (in most events). The new vehicle location 45 implies a new map and a separate map image may be allocated and displayed for that time instant. The vehicle's position within the map may be indicated by an icon marker 46 to reflect the position of the vehicle as measured by the vehicle event recorder. In a an event replay, the series of map images may be played back synchronously alongside the actual forward view images captured at the vehicle event recorder camera.

A mapview player in accordance with this teaching is particularly useful when it is arranged to present maps with enhancements and markings which are derived from information in the event record dataset. For example, when actual vehicle speeds are compared to local speed limits, a determination is possible with regard to all regions in which a speed infraction occurs. A graphical representation of same may be included superimposed with maps presented.

Figure 5:
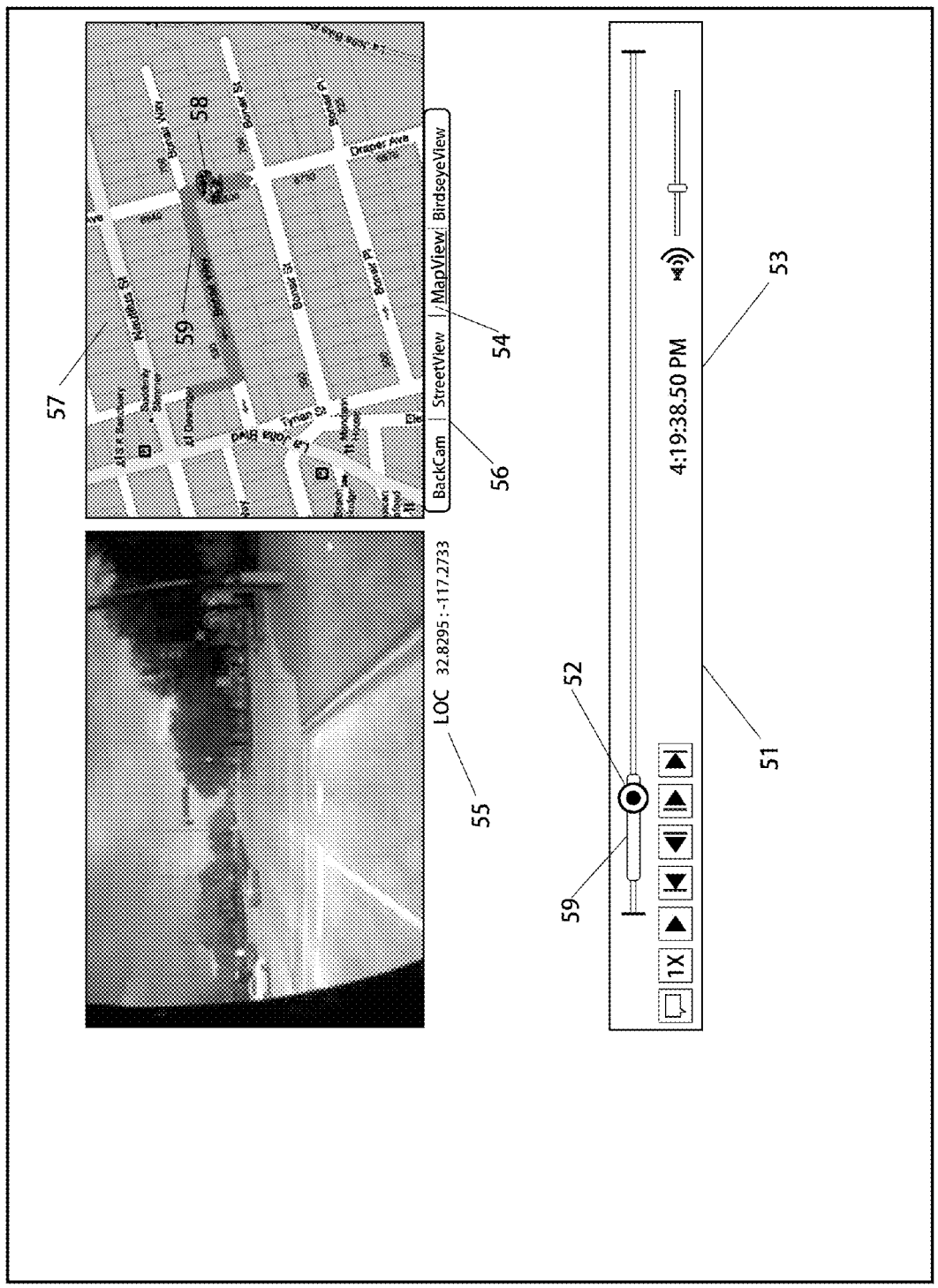

With reference to FIG. 5, timeline control object 51 agrees with the event record dataset from a vehicle event recorder. A playback instant control 52 marks an instantaneous moment of the event period. At the moment 4:19:38.50 p.m. indicated in a numeric label control 53, the vehicle GPS system determined the vehicle location at latitude 32.8295 and longitude −117.2733 as recorded by the vehicle event recorder's position determining system and position is reported numerically at position label control 54.

With the video player set into a mapview mode 55 by a tabstrip tool 56, a map image 57 suitable in scale and location is presented with particular regard to the vehicle's location at the corresponding instant in time. An icon image of a car 58 marks the precise location in the map. In addition, a spatial highlight 59 for example in red transparent markings (highlighting portions of Bonair and Draper streets in the image), is superimposed on the map image to mark regions where speeding infractions have been identified.

Timeline marker 59 designates a finite period of time within the event period when the speeding occurs. Thus, some timeline controls of these systems include marker objects aligned and cooperative with elements appearing in virtual videos. This cooperation is due to careful associations with time instants within the event period.

Both the streetview player and the mapview player offer important advantages in reaching a complete understanding of particulars of a scene. Indeed where these are additionally augmented based on information collected by a vehicle event recorder, they are of particular advantage.

However, they do not complete the range of useful video playback players of this invention. Another important virtual video player useful in these systems may be characterized as a bird's eye view virtual video player.

Bird's Eye View Player

Figure 6:
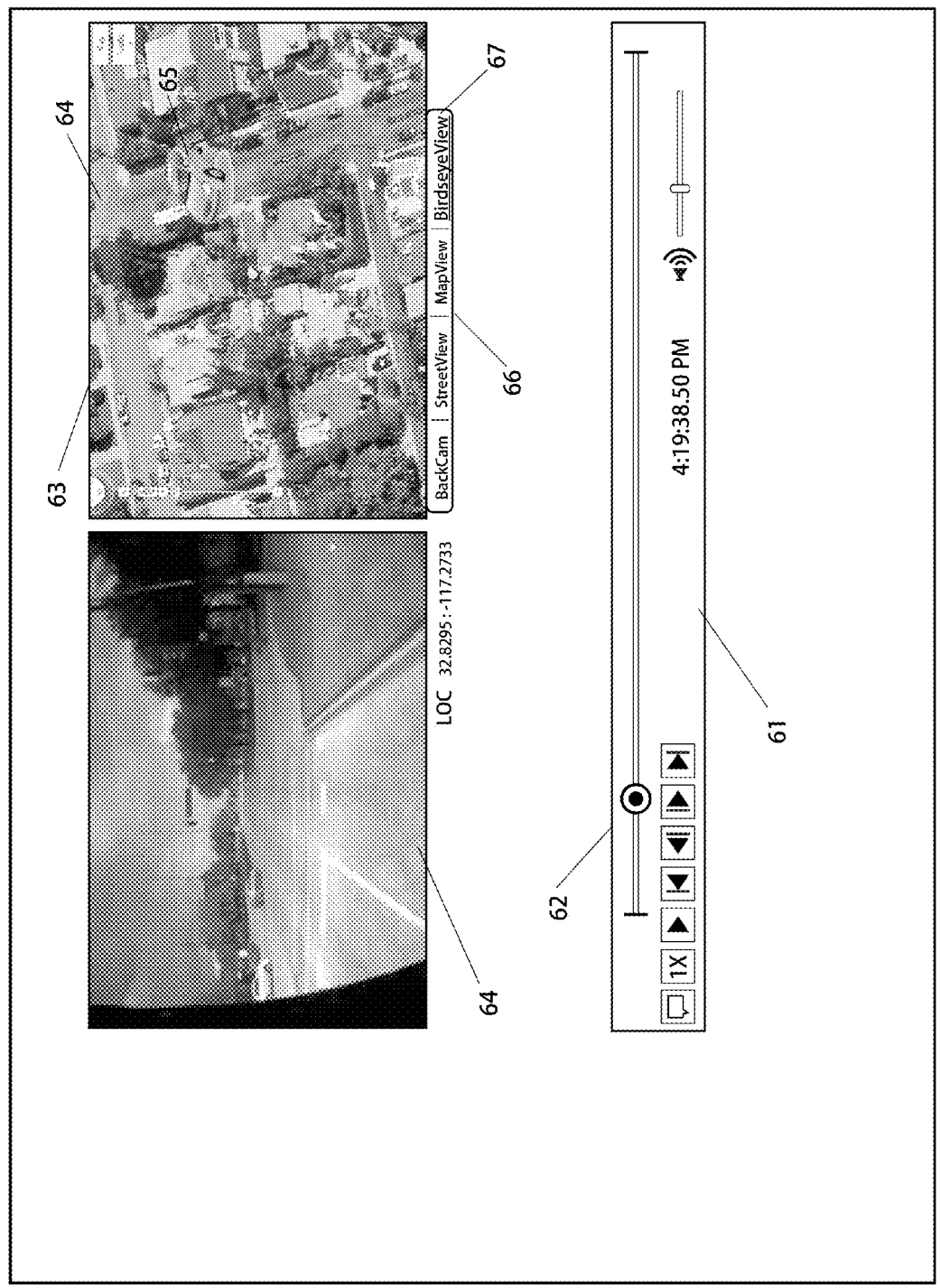
Figure 7:
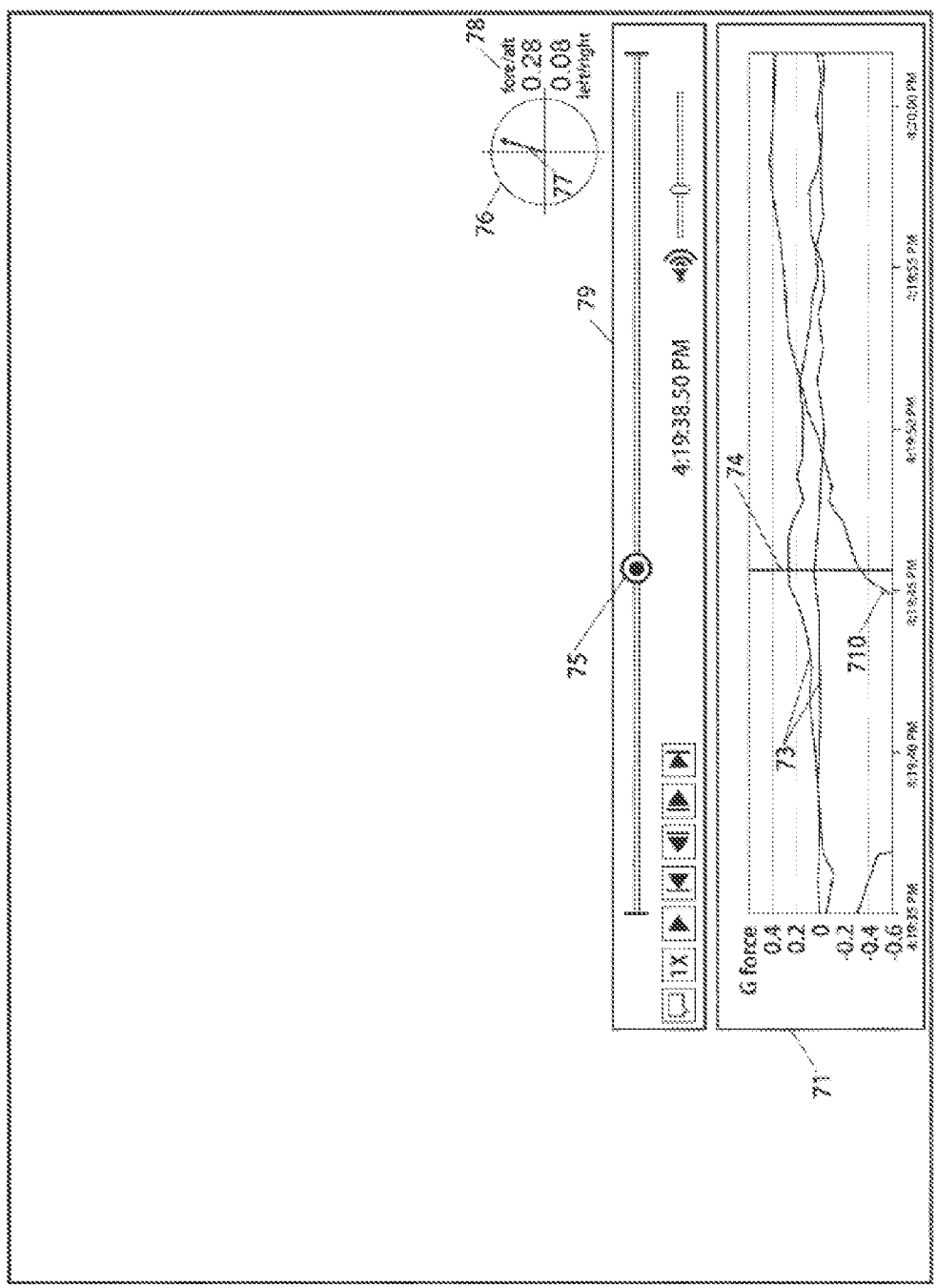
FIG. 7 illustrates in isolation, coupled control objects designed to express data both graphically and alphanumerically—the control objects being further coupled and responsive to a vehicle event timeline.

Illustrated in FIG. 6, a bird's eye view video player of these systems includes images taken from an elevated viewpoint for example images made from an airplane or satellite. In consideration of the vehicle's time-dependent position as measured and recorded by a vehicle event recorder, images are selected from a prerecorded database of so described images.

Timeline control 61 specifies one instant in time by a playback instant control 62. Video player display 63 includes an image 64 and a 'car' icon marker 65 to indicate the location of the vehicle at the capture time 4:19:38.50.

When tabstrip 66 is used to set the video player into a bird's eye view mode 67, an image series of perspective images made from altitude is played back in time with respect to the event timeline. As the event player executes playback of event data, moves over the event period, bird's eye images and marker icon are updated for each instant of the timeline to reflect appropriate views of the event scene.

Because the precise image viewpoint is highly selectable (in part due to some very clever image processing tricks), it is possible to specify that the viewpoint be constant at a virtual location, for example 100 meters behind the car and 50 meters above the car, and the view direction is pointing in the direction of travel with respect to the vehicle. In this way, the bird's eye view playback virtual video can be envisioned as if a helicopter video camera followed the car throughout the event to make the video images. A reviewer gains a most clear understanding of the event environment as presented in a synchronized manner alongside with other event record information.

Accordingly, these vehicle event data playback systems include both real view video players and virtual video players which are arranged to interact with exception event data recorded in vehicle event recorders. Each of these specialized video players provides a time synchronized image series in conjunction with a visual presentation of other important related event record data.

While the preceding detailed description nicely sets forth several novel video playback control objects, the following description is directed to other aspects of these vehicle event playback systems which are not based upon data from image systems. Rather, the graphical user interface control objects presented herefollowing express non-image data from a plurality of diverse sources. In some cases, these diverse sources include onboard systems. In other cases, information sources may include those which are external with respect to any vehicle and its vehicle event recorders.

In a first instance, graphical user interfaces of these playback systems having control objects bound to vehicle onboard systems are described in detail. These come in two primary types including: 1) control objects bound to data from sensors deployed as part of a vehicle event recorder apparatus, for example, a vehicle event recorder may include accelerometers which measure G-force levels in two orthogonal spatial dimensions while a vehicle is being used; and in a second type of control object, 2) a control object is bound to vehicle subsystems characterized as those installed by a vehicle manufacturer. Data provided by way of a vehicle's OBD and ECU systems are received, managed, parsed and time-stamped at a vehicle event recorder which forms a dataset to which certain important control objects of the graphical user interfaces may be bound. Yet another type of data which may be included is characterized as calculated data. Data generated by analysis modules of the vehicle even recorder or coupled servers, such as wasted fuel estimate, triggers, calculated fuel consumption from mass air flow sensors, et cetera, may also be presented in these event player systems.

Some important control objects of these systems are bound to data sources not part of any vehicle event recorder system and indeed totally external with regard to vehicle subsystems. These control objects may be nevertheless implicitly strongly coupled to event record datasets which are subject to playback in these devices and methods. In one illustrative example, a notation system which associates an expert reviewer's comments and notes with certain portions of an event record in a note field or notation control object may be coupled to receive data therefrom. Details of each of these types follow.

Acceleration (2-D G-Force) Control Object

In one important version, a control object or plurality of control objects are coupled to the timeline control and thus the event period to affect time synchronization between these. Acceleration control objects are preferably arranged to visually show acceleration data collected during an exception event captured at a vehicle event recorder. With respect to acceleration data collected in a vehicle event recorder, it is most useful to present this type of information in two fashions. First, it is useful to present instantaneous acceleration data associated with an instant of time during the event period. In a second fashion, acceleration data collected over the entire event period (or finite subset thereof) is usefully displayed in a graph of two axes. Force data is preferably presented in a form where the abscissa of which is preferably time, and the ordinate force.

A first acceleration control object includes a line graph 71 representation of acceleration data into orthogonal directions. 'G-force' or acceleration is plotted versus time to form line representations 73 of acceleration data. A playback instant indicator 74 is synchronized with the playback instant indicator 75 of the timeline control object both spatially and with respect to displayed data.

Another related acceleration control object 76 which expresses acceleration data in an alternative visual form is additionally illustrated. This 2-D expression of instantaneous force includes a pointer 77 which gives a visual representation of force in both forward/aft and left/right directions 78.

Both versions of acceleration control objects are bound to information in the event record dataset whereby synchronization is realized with respect to the timeline control and all other control objects similarly bound including the video display control objects. Accordingly, control objects may be arranged to present instantaneous data as well as plots of data over time. In both cases, these controls are bound and responsive to the playback timeline 79.

Factory-Installed Vehicle Subsystem Data

Highly advanced vehicle event recorder systems produce information-rich event record datasets. Event record datasets of high performance vehicle event recorders sometimes includes data captured at vehicle subsystems, for example by way of the onboard diagnostics and engine control unit. In vehicle event recorder systems so equipped, data captured at various vehicle subsystems may be time-stamped in a scheme coordinated with the event period and additionally with video frame capture rates. Where such data is carefully time-stamped, it is in good condition for synchronous replay via these vehicle event data playback systems.

Accordingly, these vehicle event data playback systems are particularly suited for playback of vehicle event records having been formed with time-stamped data from factory installed vehicle subsystems. In particular, some vehicle event recorder systems are arranged to capture engine speed data and further to associate a time instant with speed data measurements. In preferred versions, engine speed in 'revolutions per minute' or RPM, may be read from the ECU by way of an OBD coupling to which a vehicle event recorder may be connected. In some important alternative versions, engine speed measurements may be made via 'aftermarket' installed sensors and vehicle subsystem detector which can obviate need to directly couple with the ECU. In either case, when event record datasets which are compatible with these playback systems are prepared and recorded, engine speed measurements each must be associated with an instant in time or "time-stamped". In systems common in the art where engine speed is recorded, engine speed is generally recorded without regard for simultaneous and synchronized playback. In those systems, engine speed data is not necessarily provided with any association with time. Because it is a goal of these playback systems to playback data in a highly synchronized fashion, it is necessary to time stamped data in this way. Where vehicle subsystems, for example engine tachometer does not provide measurement data at a rate equal or similar to video camera frame rates, data smoothing and or data averaging may be used to improve a dataset or portion thereof to make it better cooperate with the objectives of these playback systems which necessarily include a discrete number of time instances on an event timeline. Common vehicle tachometers do not face this restriction and are otherwise free to take measurements at any convenient rate includes those rates having unequal periods between data measurements. Because time synchronization is an important part of these playback system, it is necessary to account for the precise moment any measurement is made in order that orderly time synchronized playback is possible.

Nearly all modern vehicle manufacturers include advanced electronic systems with many of the vehicle's subsystems. For example, a mechanical accelerator pedal often includes a transducer from which pedal position is readily measured. However, electronic data which might exist within a vehicle's proprietary electronic control schemes is not always readily available on third-party networks. Although industry standards are carefully provided, discrepancies remain in capture of such data continues to be prohibitively complex or expensive. For this reason, most vehicle event recorders are unable to record information relating to certain vehicle performance parameters for example an odometer or fuel flow meter on light duty vehicles.

In special cases where a vehicle event recorder can be successfully coupled to vehicle electronic subsystems whereby they operate to receive this data, they must be further adapted to carefully pass the data and manage a timestamp scheme in conjunction with the particular nature of the vehicle event recorder. For example, if a vehicle event recorder operates with a video frame rate of 30 frames per second, but the factory installed throttle position data only update three times per second, a data recording scheme must be set to rectify timing issues between these independent data sources so that an event dataset accurately reflects an 'instantaneous' time value for all data elements.

Engine Speed and Vehicle Speed Control Objects

To date, there has not yet been any vehicle event recorder system which records time-stamped engine speed data. As such, synchronized playback of same has been impossible. However in systems disclosed herein, engine speed information is expressed graphically in a visual presentation and additionally in an alphanumeric expression in an engine speed control object 81. An engine speed control object of this example is comprised of graphical portions and alphanumeric portions. An analog arc 82 provides a range continuum upon which instantaneous magnitude may be displayed by a pointer 83. A digital numeric readout 84 allows an instantaneous report of engine speed for any instant of the event timeline 85. Playback instant indicator 86 may be moved (e.g. via mouse type computer pointing peripheral device) to any point along the timeline and engine speed control object which is bound to the timeline is updated to indicate the engine speed recorded at that particular time.

In a similar control object, vehicle speed control object 87, pointer 88 yields an instantaneous value of '31 mph' on an analog scale while a digital numeric value 89 is also provided at vehicle speed label.

Event records which are compatible with and may be played by these vehicle event playback system include measurement data from the groups characterized as those including: throttle position data, engine load data, power takeoff system data, malfunction indicator light system data, brake system data, antilock brake system data, automatic traction control system data, electronic stability control system data and excess fuel consumption system data among others. FIG. 9 illustrates. An event timeline 91 having playback instant indicator 92 set at time corresponding to 4:19:53.00 p.m. is coupled to a plurality of important control objects. Each of said control objects are arranged to express time-stamped data in a visual presentation which may include both graphical and alphanumeric representations of same.

Throttle State Control

Most vehicle event recorder systems are incapable of recording data related to throttle position. However, this remains an important factor in many collision scenarios and also fuel analysis. For example, it is sometimes useful to understand how much time passes between the time a red light traffic signal appears (detectable via forward view video review—for example) and the time a vehicle operator disengages application of power, i.e. removes foot from an accelerator pedal. Because it is very difficult to arrange a custom sensor to detect accelerator position, nearly all types of vehicle event recorders include datasets devoid of this critically important data.

While access to this information is sometimes available on a vehicle's ECU system, to date it has been prohibitively difficult to couple vehicle event recorders to the ECU of modern vehicles. Where that has been achieved, the dataset produced by such advanced vehicle event recorders must include time synchronization management schemes with respect to its video camera. These systems include time-stamped data regarding throttle state where event record dataset having such timestamp throttle state data are available, these vehicle event data playback systems are cooperative and provide graphical user interface controls which are suitably responsive to such event record datasets.

A graphical user interface with a throttle state control object provides graphical expressions of throttle states. The control object is further coupled to an event timeline and corresponding event timeline control whereby the instantaneous throttle state for any time in the event period may be selectively displayed by the control.

In one preferred version of such throttle state control object, both an instantaneous numeric value 93 (digital) and a graphical expression 94 (analog) of the throttle state is given for each instant of the timeline control. When the playback instant indicator is moved to another position of the event timeline, the throttle state control is updated such that data represented there is updated in synchronization with other controls of the graphical user interface including video.

Figure 1:
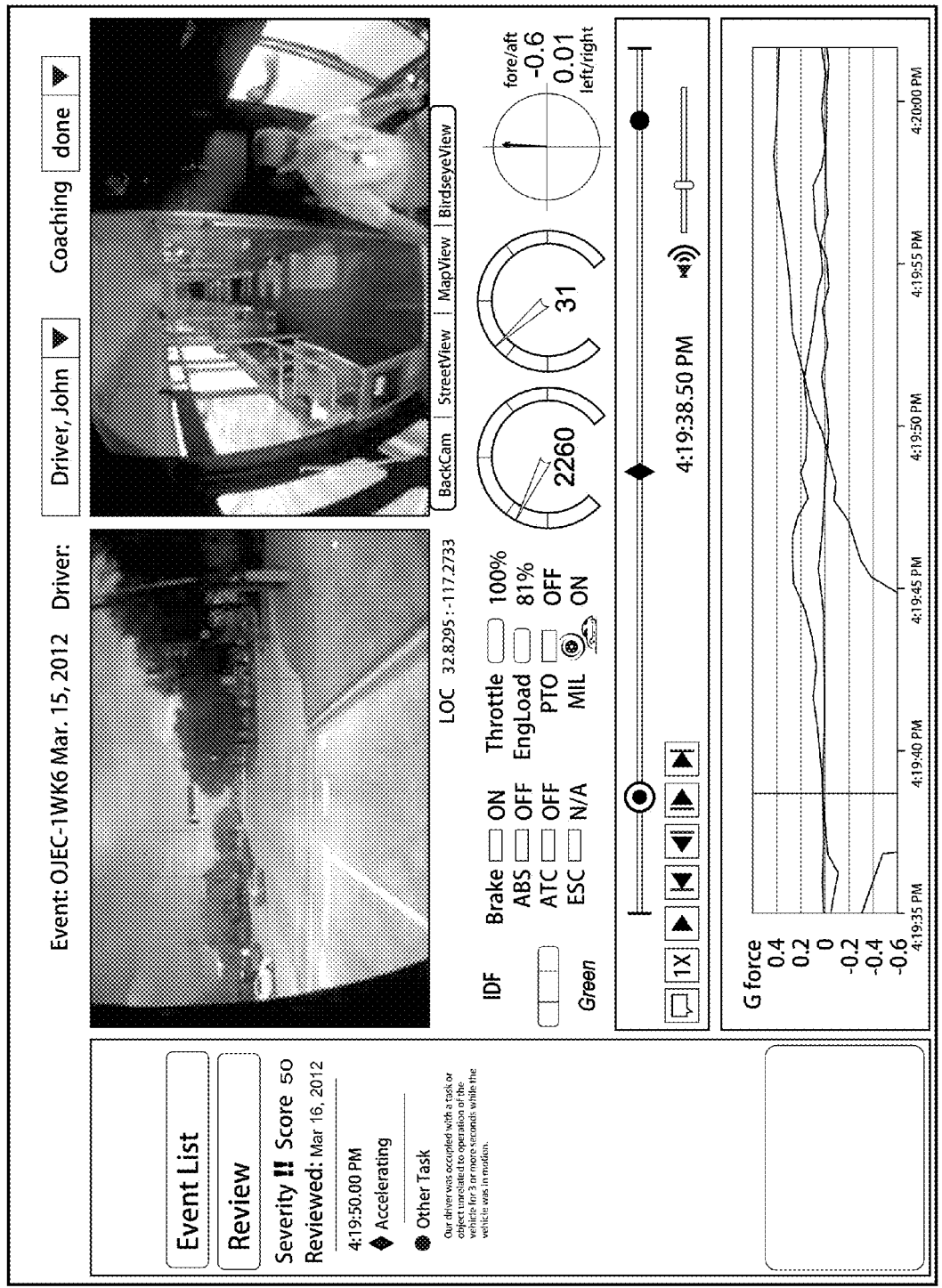
Figure 2:
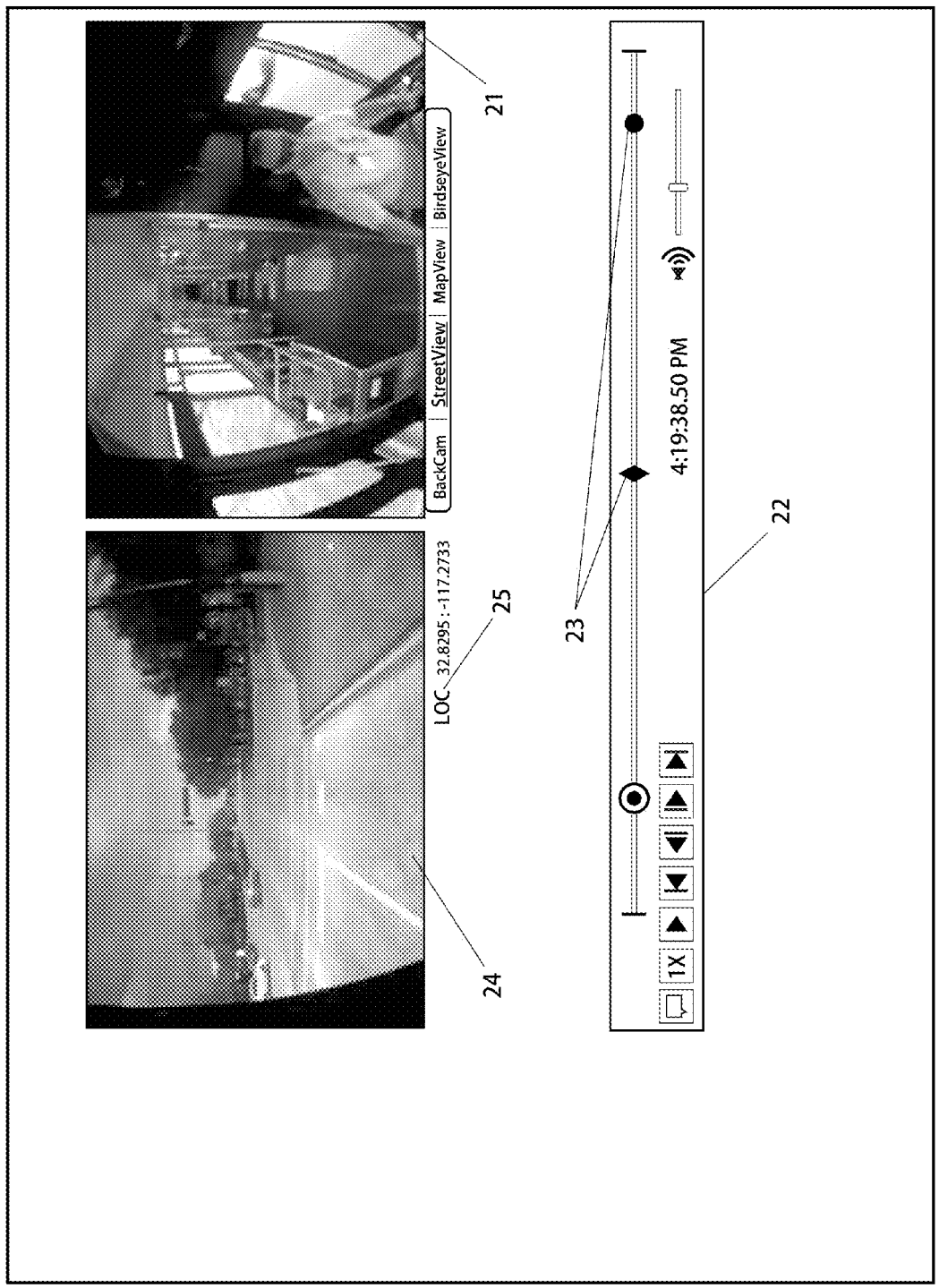
Figure 3:
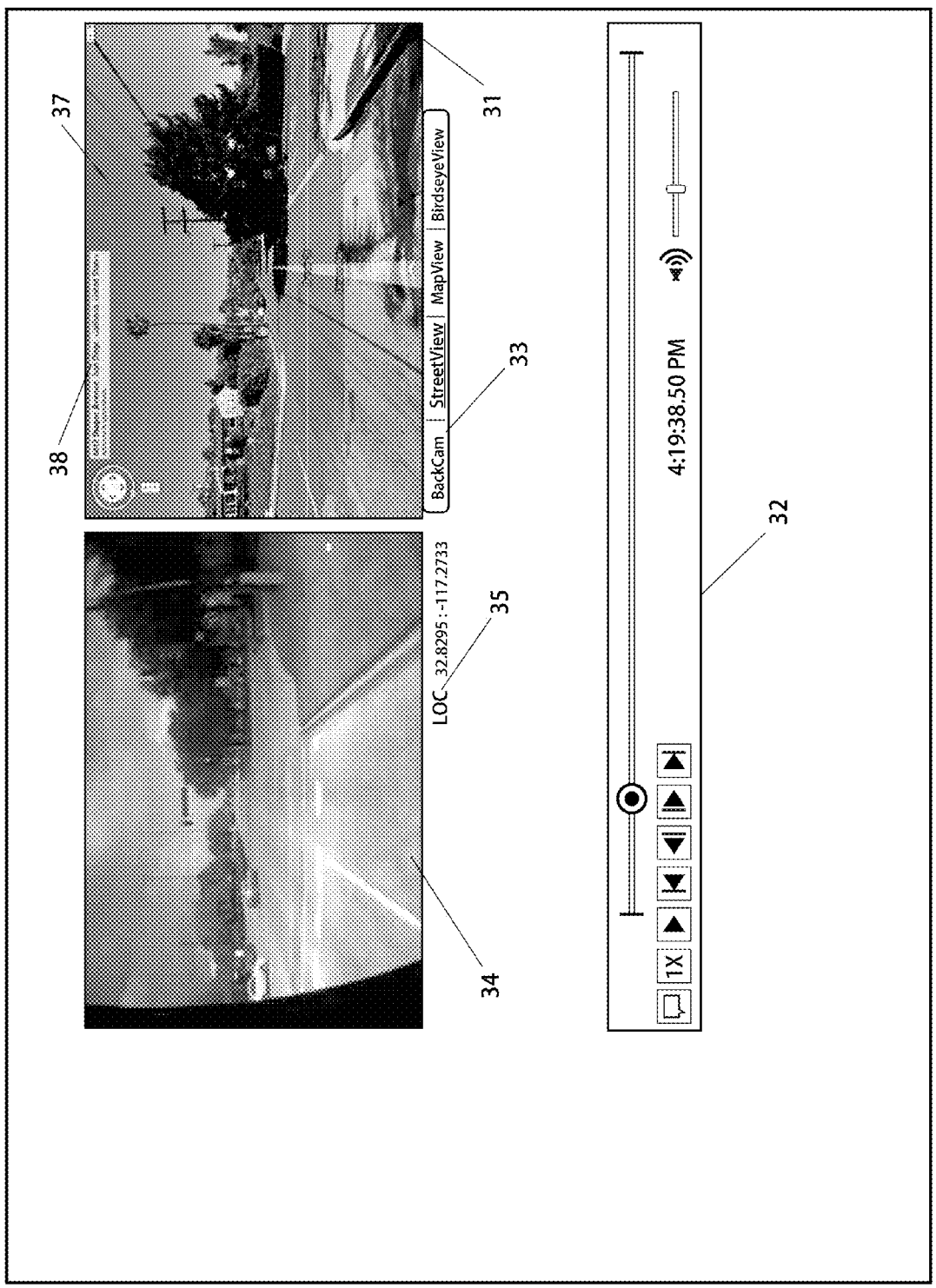
FIG. 3 illustrates side-by-side, time synchronized video players coupled to two video data sources related via a vehicle event record dataset.

The video of video playback control object indicates a red traffic signal has occurred at 4:19:44, we can see by sliding the playback instant control to that moment of the timeline that the throttle state remained at 100% (recall FIG. 1). However, when the playback instant control is advanced further down the timeline to about 4:19:46, we can see the throttle position is at 0%.

This may be verified further in consideration of vehicle speed 710 data presented in a continuum chart. In it one can see that the vehicle begins to decelerate just before 4:19:45. While the acceleration data is a good indicator of when the driver releases the throttle, it remains imprecise. To learn the precise time the throttle was released, the playback instant control must be manipulated to indicate a time prior to 4:19:45 and the throttle state control must be reviewed. This control more accurately tells a more full story as it relates to the question "when did the driver respond" rather than the question "when did the vehicle respond". Accordingly, in some circumstances a throttle state control well synchronized with related data and bound to a timeline control unit will tell the full story which otherwise could not be known in the absence of throttle state information.

Similarly, a graphical user interface engine load control object 95 may be included in some versions of these vehicle event data playback systems. A sensor installed by a vehicle manufacturer produces data to indicate engine load on a scale from 0% to 100%. Data from the sensor is available on the ECU via the OBD. Data which indicates engine load may be periodically detected or captured and added to the event record dataset produced by advanced vehicle event recorders. This step must be done with particular attention to time calibration and/or time synchronization. For example data from the OBD may arrive at irregular intervals. Or the data may arrive with extreme time jitter between successive measurements. In all cases, for this data to be useful in playback systems taught herein, it must be carefully synchronized with other events encoded in event records. It is not enough with respect to the present vehicle event data playback systems to merely collect multiple readings of engine load but rather because of the particular playback characteristics suggested here, engine load data (among other) must be carefully time stamped before being included as part of these event records. The benefit of engine load data is to help understand how heavily loaded the engine is given its speed (RPM). This could inform the user if the vehicle was heavily loaded, whether the driver had excess power that he could have used for an evasive maneuver, et cetera.

Power Takeoff Control

Another information source which relates to vehicle performance which may be replayed in these event data playback systems relates to power distribution. Sometimes it is important to know when engine power is needed by and being delivered to auxiliary systems. If vehicle engine is delivering power to coupled power consuming subsystems (e.g. refrigeration, hydraulic actuator, et cetera) an event record may be configured to indicate the status of any power takeoff systems.

In certain versions, a power takeoff indicator may be embodied as a binary indicator. A power takeoff control object arranged to indicate binary states for every instant of an event timeline may include a graphical portion 96 and an alpha numeric portion 97.

Other control objects are provided similarly to visually present data collected from vehicle subsystems which additionally may include: a brake indicator control object 98, an antilock braking system ABS control object 99, an automatic traction control ATC control object 910, and an electronic stability control ESC control object 911. Each of these graphical user interface control objects may be driven by data contained in an vehicle event recorder event dataset and be responsive thereto. Further, each of these controls may be bound to the timeline control object whereby visual presentation of data in all controls is time synchronized. Still further each of these controls may present data in both graphical and/or alphanumeric presentations.

One important aspect of these control object relates to their graphical nature. In systems which produce data having a limited few states, it is sometimes convenient to present the data states via prescribed and/or preconfigured icon symbols. For example a malfunction indicator light (MIL) system might operate to provide driver alerts with respect to five types of malfunction in addition to a binary 'ON'-'OFF' value 912. A low tire pressure icon 913 may be displayed to indicate a malfunction of a particular nature. The control object which remains synchronized with event playback, will be showing both its 'ON'-'OFF' indication and malfunction type via the displayed icon.

Excess Fuel Consumption Control Object

Very advanced vehicle event recorders sometimes include an excess fuel consumption indicator. When a driver takes an action which is determined to be one associated with excess fuel consumption, an excess fuel consumption indicator may provide a driver with instant feedback to signal the condition. Where vehicles are equipped with such devices, they may also provide data to be included in a vehicle event recorder event record dataset. Accordingly, these vehicle event data playback apparatus also include a special instant driver feedback control object 914. Because feedback is sometimes provided as a three color scheme for example, simplest versions of instant driver feedback control object may similarly express these discrete feedback states. This control object is another good example which illustrates the value of highly visual playback of vehicle event records. When an indicator is given to a driver to alert him that a maneuver has caused excess fuel consumption, it is important to understand in detail a driver's detailed response in order to administer appropriate coaching. With these playback systems, it is very easy to visualize and completely understand details associated with vehicle operation. Thus a reviewer/coach can see clearly decipher a driver response to instant feedback relating to fuel consumption maneuvers.

While most controls described to this point have been bound to data collected in vehicle event recorder systems, it is not a necessity that information and data be sourced in this fashion. Indeed, there are very important information sources not part of the vehicle event recorder which nevertheless contributes to data playback in these systems.

Notations Field Control Object

High-performance vehicle event recorders record data from vehicle systems and form an event record which details many aspects of vehicle and driver performance. In some of these systems, a human reviewer studies video captured in an event record and prepares notes and observations in accordance with his study of the event videos. In addition to these notes, a human reviewer also sets discrete values for some prescribed parameters—i.e. a binary value for seatbelt on/off. Some of these notes are general to the entire event period (i.e. a 'no seat belt' infraction) and others are particular to certain time portions of the event period or a single instant in the event period. Once prepared, the notations become appended to and part of an event record. When event records are played back in these data players, special provision and facility is made for these notations.

FIG. 10 shows one illustrated example of a timeline control 101 coupled to a notation field control 102. The notation field may include numeric review data such as a score value 103 and icon indicator 104 related to severity, a review date label 105 and a note list 106 containing therein a plurality of note entries (two notes entries are shown in the example).

A first note 107 relating to an occurrence of "aggressive accelerating" is coupled to timeline marker pip 108 while "other task" notation 109 is coupled to timeline marker pip 1010. Finally, note field 1011 contains text which describes the reviewer's detailed observations as those relate to the 'other task' note. Since these notes relate to specific parts of the event period, event playback is improved when note text is appropriately displayed with respect to the note time association during the event data playback.

Access to various of these notes may also be affected by pointing and clicking on the timeline pip marker elements. For example, if a user were to click on the diamond shaped marker pip, the "other task" note closes and the "aggressive accelerating" note opens to reveal text of that note. In this way, access to all appended notes is readily available via timeline cues.

The notation control object described in the foregoing graphs is illustrative of a first kind of information whose source is not from onboard a vehicle but nevertheless is highly related to a vehicle event playback. It is not the only of such source which may provide information related to a vehicle event but not part of the vehicle, any of a vehicle's subsystems, nor a vehicle event recorder.

Indeed another important information source external from the vehicle includes one which reports on environmental conditions related to the time and location of the recorded event. In one type of environment control object 1012, the state of the weather is reported as recorded in remote weather reporting stations. For example, if an event recorder produces an event record with precise location and time information, a weather station can report approximate ambient temperature at the text label 1013. It could further report approximately whether or not the roadways were dry or wet at that time via icon display 1014. It could also indicate, albeit by a bit of prediction, whether or not the roads were icy or snowy. These systems may indicate whether or not the event occurred during a windy day. In view of sidereal time, and in further view of a vehicle's direction of travel (as recorded by a vehicle event recorder), this control object may indicate the level of sun glare 1015 which may have hindered a driver's visibility during an event. A weather reporting station accessed via the Internet after an event record is made, may provide such pertinent data.

FIG. 11 illustrates a few additional important features. For reference, event timeline control 111 is illustrated in this drawing. A 'now playing' event label 112 identifies an event which is currently being addressed by or is subject of the event data player. A driver 113 drop-down type selection box 114 permits operators of these playback systems to select other fleet drivers to which these playback systems may be pointed to view events associated with that particular driver. Another selection box 115 enables an administrator to further mark an event with additional notation to indicate a training status.

One will now fully appreciate how vehicle event record playback systems may be arranged and configured to present compound event data related to vehicle and driver performance in a highly detailed and time synchronized visual presentations. Although the present invention has been described in considerable detail with clear and concise language and with reference to certain preferred versions thereof including best modes anticipated by the inventors, other versions are possible. Therefore, the spirit and scope of It is claimed:

1. A vehicle event data playback apparatus comprising:
a logic processor configured to facilitate display of information stored electronically in a vehicle event record that corresponds to a vehicle event, the information stored in the vehicle event record being received from a vehicle event recorder mounted in a vehicle, the information stored in the vehicle event record received responsive to detection of the vehicle event by the vehicle event recorder, the vehicle event comprising a vehicle operation anomaly detected during operation of the vehicle by a vehicle operator, the vehicle event record including visual information and vehicle operation information for a period of time that includes the vehicle event, wherein the vehicle event is associated with excess fuel consumption;
a graphical display device configured to display vehicle event record information via a graphical user interface system; and
the graphical user interface system,
a view of said graphical user interface system comprising:
a plurality of control objects, the plurality of control objects comprising two or more of an engine load control object, a power take-off control object, a traction control object, an electronic stability control object, or an excess fuel consumption control object, the plurality of control objects corresponding to data values of the vehicle event record and configured such that a visual appearance of the plurality of control objects changes based on changes in the data values in said vehicle event record over time during the vehicle event, wherein the plurality of control objects further includes one or more video player control objects and a notations field object configured to receive notations from a reviewer through entry and/or selection of information from the reviewer, wherein the notations include a first notation that is associated with an indicator related to a severity of an infraction by the vehicle operator during the vehicle event, and wherein the logic processor is further configured to associate the first notation with a corresponding point in time such that the first notation is displayed at the corresponding point in time during subsequent playback using the vehicle event data playback apparatus, wherein the excess fuel consumption control object reflects instant feedback that has been provided to the vehicle operator in response to the vehicle event;
a line graph representation of the data values in the vehicle event record over time that corresponds to the plurality of control objects; and
a video player configured to display video data of the vehicle event record that is synchronized in time with the plurality of control objects and the line graph representation, wherein the video player is further configured to display information that reflects a response by the vehicle operator to the instant feedback.

2. The vehicle event data playback apparatus of claim 1, wherein the notations further include a second notation, wherein the logic processor is further configured to associate the second notation with a corresponding period of time that includes time prior to the corresponding point in time and that further includes time subsequent to the corresponding point in time, and wherein the second notation is displayed throughout the corresponding period of time during subsequent playback.

3. The vehicle event data playback apparatus of claim 1, wherein the graphical user interface system is configured such that the view of the graphical user interface system further comprises a timeline control object, said timeline control object having a start time, an end time, and a discrete number of time instants therebetween.

4. The vehicle event data playback apparatus of claim 3, wherein the logic processor is configured such that the timeline control object is coupled to the plurality of control objects of the graphical user interface to effect time synchronization between coupled control objects.

5. The vehicle event data playback apparatus of claim 4, wherein the graphical user interface system is configured such that the plurality of control objects provide visual expressions of data related to vehicle operation.

6. The vehicle event data playback apparatus of claim 4, wherein the graphical user interface system is configured such that the plurality of control objects include four or more of a g-force control object; an engine speed control object; a vehicle speed control object; a throttle position control object; the engine load control object; the power take-off control object; a malfunction indicator light control object; a brake system control object; an anti-lock brake system control object; the traction control object; the electronic stability control object; the excess fuel consumption control object; a notation control object; or an environment state control object.

7. The vehicle event data playback apparatus of claim 3, wherein at least one of the video player control objects is arranged for playing data files comprising an image series via the video player.

8. The vehicle event data playback apparatus of claim 3, wherein the graphical user interface system further comprises at least two of the video player control objects, wherein video images presented via the individual video player control objects are synchronized in time such that images simultaneously displayed have a frame capture time instant which is substantially the same.

9. The vehicle event data playback apparatus of claim 1, wherein the graphical user interface system is configured such that the one or more video player control objects include a first virtual video player and a second virtual video player, the first virtual video player characterized as a streetview video player and configured to play one or more streetview image series derived from sources other than the vehicle event recorder, the one or more streetview image series including images captured at a time independent and different from an event period during which the vehicle event occurred, the images captured from a plurality of discrete street locations, the second virtual video player characterized as a mapview video player and configured to play one or more map image series including images characterized as map images, wherein the video player is configured to display video data of the vehicle event record that is synchronized in time with the first virtual video player and the second virtual video player.

10. The vehicle event data playback apparatus of claim 9, wherein the one or more streetview image series is comprised of images made from locations that substantially correspond to locations recorded by the vehicle event recorder in the event record.

11. The vehicle event data playback apparatus of claim 10, wherein the graphical user interface system is configured such that the one or more streetview image series further includes icons and augmentations determined based on data captured in the vehicle event record.

12. The vehicle event data playback apparatus of claim 11, wherein the graphical user interface system is configured such that said icons or augmentations are characterized as those from the group including: those which indicate a location of the vehicle event; those which indicate a direction of travel; those which indicate a street name; and those which identify landmarks.

13. The vehicle event data playback apparatus of claim 9, wherein the graphical user interface system is configured such that said map images include locations which substantially correspond to locations recorded in the vehicle event record.

14. The vehicle event data playback apparatus of claim 13, wherein the graphical user interface system is configured such that said map images further include augmentations which depend upon data captured with the vehicle event recorder.

15. The vehicle event data playback apparatus of claim 14, wherein the graphical user interface system is configured such that said augmentation is characterized as a vehicle position indicator.

16. The vehicle event data playback apparatus of claim 14, wherein the graphical user interface system is configured such that said augmentation is characterized as an infraction indicator.

17. The vehicle event data playback apparatus of claim 9, wherein the graphical user interface system is configured such that the one or more video player control objects further includes a third virtual video player, the third virtual video player characterized as a bird's eye view player.

18. The vehicle event data playback apparatus of claim 2, wherein the corresponding period of time of the second notation includes a start time of the corresponding period of time and an end time of the corresponding period of time, wherein the start time is received from the reviewer through entry and/or selection of information, and wherein the end time is received from the reviewer through entry and/or selection of information.

* * * * *